United States Patent
Sonoda et al.

(10) Patent No.: US 9,544,194 B2
(45) Date of Patent: Jan. 10, 2017

(54) NETWORK MANAGEMENT SERVICE SYSTEM, CONTROL APPARATUS, METHOD, AND PROGRAM

(75) Inventors: Kentaro Sonoda, Tokyo (JP); Hideyuki Shimonishi, Tokyo (JP); Toshio Koide, Tokyo (JP); Yoichi Hatano, Tokyo (JP)

(73) Assignee: NEC CORPORATION, Tokyo (JP)

(*) Notice: Subject to any disclaimer, the term of this patent is extended or adjusted under 35 U.S.C. 154(b) by 6 days.

(21) Appl. No.: 14/343,711

(22) PCT Filed: Sep. 7, 2012

(86) PCT No.: PCT/JP2012/005691
§ 371 (c)(1),
(2), (4) Date: Mar. 7, 2014

(87) PCT Pub. No.: WO2013/035342
PCT Pub. Date: Mar. 14, 2013

(65) Prior Publication Data
US 2014/0247751 A1    Sep. 4, 2014

(30) Foreign Application Priority Data
Sep. 9, 2011    (JP) .................... 2011-197518

(51) Int. Cl.
H04L 12/26    (2006.01)
H04L 12/28    (2006.01)
H04L 12/24    (2006.01)

(52) U.S. Cl.
CPC ....... H04L 41/0893 (2013.01); H04L 41/5064 (2013.01)

(58) Field of Classification Search
CPC .... H04L 45/308; H04L 41/0893; H04L 45/74; H04L 43/026; H04L 41/5064; H04L 41/63; H04L 45/38

(Continued)

(56) References Cited

U.S. PATENT DOCUMENTS 6,880,089 B1 * 4/2005 Bommareddy et al. ........ 726/11
2005/0198359 A1 * 9/2005 Basani .................. H04L 69/329
709/232

(Continued)

FOREIGN PATENT DOCUMENTS

JP    2002-51040 A    2/2002
WO    WO 2008/095010 A1    8/2008

(Continued)

OTHER PUBLICATIONS

International Search Report dated Jun. 11, 2012 in International Patent Application Publication No. PCT/JP2012/005691.
Nick McKeown and seven other authors, "OpenFlow: Enabling Innovation in Campus Networks", [online], [searched on Sep. 1, Heisei 23 (2011)], Internet <URL: http://www.openflow.org/documents/openflow-wp-latest.pdf>.

(Continued)

Primary Examiner — Gerald Smarth
(74) Attorney, Agent, or Firm — McGinn IP Law Group, PLLC.

(57) ABSTRACT

A network management service system includes a policy management apparatus that receives updating of a communication policy from an user and manages the communication policy for each user; a control apparatus that generates a packet handling operation of a packet associated with the communication policy of the user, in response to a request from the user, and sets the generated packet handling operation in a forwarding node(s); and the forwarding node(s) that processes the packet using the packet handling operation generated by the control apparatus.

15 Claims, 18 Drawing Sheets

(58) Field of Classification Search
USPC .......................................................... 370/254
See application file for complete search history.

(56) References Cited

U.S. PATENT DOCUMENTS

| | | | |
|---|---|---|---|
| 2006/0104231 A1* | 5/2006 | Gidwani ....................... | 370/328 |
| 2006/0104232 A1* | 5/2006 | Gidwani ....................... | 370/328 |
| 2009/0132534 A1* | 5/2009 | Yao et al. ......................... | 707/8 |
| 2011/0242971 A1* | 10/2011 | Kokado .............. | H04L 61/2582 |
| | | | 370/226 |
| 2011/0286331 A1* | 11/2011 | Lauer ................ | H04B 7/18506 |
| | | | 370/328 |
| 2011/0310901 A1* | 12/2011 | Uchida ................ | H04L 43/026 |
| | | | 370/392 |
| 2012/0054296 A1* | 3/2012 | Chaudhry et al. ............ | 709/213 |
| 2012/0281540 A1* | 11/2012 | Khan et al. ................... | 370/241 |

FOREIGN PATENT DOCUMENTS

| | | |
|---|---|---|
| WO | WO 2011/030490 A1 | 3/2011 |
| WO | WO 2011/081104 A1 | 7/2011 |
| WO | WO 2011/083786 A1 | 7/2011 |

OTHER PUBLICATIONS

"OpenFlow Switch Specification" Version 1. 1. 0 Implemented (Wire Protocol Ox02) [online] [searched on Sep. 1, Heisei 23 (2011)], Internet <URL:http://www.openflow.org/documents/openflow-spec-v1.1.0.pdf>.

Tatsuji Shimoc, "The Progress and Transition of Identity Management Related Technologies," Journal of the Japanese Society for Artificial Intelligence, Jul. 1, 2009, vol. 24, No. 4, p. 504-511.

* cited by examiner

FIG. 2

| USER ID | ROLE ID | ATTRIBUTE |
|---|---|---|
| user1 | role_0001<br>role_0002 | IP:192.168.100.1<br>MAC:00-00-00-44-55-66 |
| user2 | role_0002 | IP:192.168.100.2<br>MAC:00-00-00-77-88-99 |
| .. | .. | .. |

FIG.3

| ROLE ID | RESOURCE GROUP ID | ACCESS AUTHORIZATION |
|---|---|---|
| role_0001 | resource_group_0001 | allow |
| role_0001 | resource_group_0002 | allow |
| role_0002 | resource_group_0001 | deny |
| role_0002 | resource_group_0002 | allow |
| .. | .. | .. |

FIG.4

| RESOURCE GROUP ID | RESOURCE ID | RESOURCE ATTRIBUTE |
|---|---|---|
| resource_group_0001 | resource_0001 | IP:192.168.0.1<br>MAC:00-00-00-11-22-33<br>SERVICE:80/tcp |
| | resource_0002 | IP:192.168.0.2 |
| | resource_0003 | IP:10.10.10.0/24 |
| resource_group_0002 | resource_000X | IP:YYY.YYY.Y.Y |
| .. | .. | .. |

FIG.5

| TRANSMISSION SOURCE | DESTINATION | ACCESS AUTHORIZATION | CONDITION (OPTION) |
|---|---|---|---|
| 192.168.100.1 | 192.168.0.1 | allow | 80/tcp |
| 00-00-00-44-55-66 | 192.168.0.2 | allow | |
| 192.168.100.1 | IP:10.10.10.0/24 | allow | |
| 192.168.100.1 | 192.168.0.3 | deny | |
| .. | .. | .. | .. |

NETWORK MANAGEMENT SERVICE SYSTEM, CONTROL APPARATUS, METHOD, AND PROGRAM

CROSS-REFERENCE TO RELATED APPLICATIONS

The present invention is based upon and claims the benefit of the priority of Japanese Patent Application No. 2011-197518 (filed on Sep. 9, 2011), the disclosure of which is incorporated herein in its entirety by reference.

TECHNICAL FIELD

The present invention relates to a network management service system, a control apparatus, a method, and a program. More specifically, the invention relates to forwarding nodes, a control apparatus that performs centralized control of the forwarding nodes, a network management service system including this control apparatus, a method, and a program.

BACKGROUND ART

Recently, a technology referred to as OpenFlow (OpenFlow) is proposed (refer to Patent Literature 1 and Non Patent Literatures 1 and 2). In the OpenFlow, communication is regarded as an end-to-end flow, and path control, fault recovery, load distribution, and optimization are performed for each flow. An OpenFlow switch specified in Non Patent Literature 2 includes a secure channel for communication with an OpenFlow controller, and operates according to a flow table in which addition or rewriting is instructed by an OpenFlow controller, as appropriate. In the flow table, a set of match fields (Match Fields) defining contents to be matched against a packet header, flow statistical information (Counters), and instructions (Instructions) defining processing content is defined for each flow (refer to FIG. 18).

When receiving a packet, the OpenFlow switch searches from the flow table an entry with match fields (refer to FIG. 18) matching header information on the received packet. When the entry matching the received packet is found as a result of the search, the OpenFlow switch updates the flow statistical information (Counters) and executes the processing content (packet transmission from a specified port, flooding, discarding, or the like) described in the field of the instructions of the entry. On the other hand, when the entry matching the received packet is not found as the result of the search, the OpenFlow switch transmits a request for setting an entry or a request for determining processing content of the received packet to the OpenFlow controller over the secure channel. The OpenFlow switch receives the entry of a flow associated with the request and then updates the flow table. As described above, the OpenFlow switch performs packet forwarding using the entry stored in the flow table as a processing rule (packet handling operation).

Paragraph [0052] of Patent Literature 1 describes that the OpenFlow controller refers to a policy file when a new flow is generated to perform permission check, and then calculates a path, thereby performing access control.

Patent Literature 2 discloses a network monitor and control system including a network monitor and control apparatus for monitoring and controlling a plurality of terminal apparatuses and a central terminal apparatus. The network monitor and control system stores information on monitoring of the terminal apparatuses and the central terminal apparatus in a memory unit of the network monitor and control apparatus. The network monitor and control system includes a remote monitor and control apparatus connected to one of the terminal apparatuses. The remote monitor and control apparatus includes a man-machine interface unit that is accessible to the memory unit of the network monitor and control apparatus through one of the terminal apparatuses and displays and outputs the information on monitoring stored in the memory unit. In the network monitor and control system, the terminal apparatuses and the central terminal apparatus are monitored and controlled, based on the information on monitoring stored in the memory unit. By providing the remote monitor and control apparatus as described above for the network monitor and control system in Patent Literature 2, the central terminal apparatus and each terminal apparatus are monitored and controlled from a remote location having no network monitor and control apparatus.

Patent Literature 1

International Publication No. WO 2008/095010

Patent Literature 2

JP Patent Kokai Publication No. JP2002-051040A

NON PATENT LITERATURE

Non-Patent Literature 1

Nick McKeown and seven other authors, "OpenFlow: Enabling Innovation in Campus Networks", [online], [searched on September 1, Heisei 23 (2011)], Internet <URL: http://www.openflow.org/documents/openflow-wp-latest.pdf>

Non-Patent Literature 2

"OpenFlow Switch Specification" Version 1.1.0 Implemented (Wire Protocol 0x02) [online] [searched on September 1, Heisei 23 (2011)], Internet <URL: http://www.openflow.org/documents/openflow-spec-v1.1.0.pdf>

SUMMARY

The disclosures of the above patent literatures and the non-patent literatures are incorporated herein in their entirety by reference thereto. The following analysis is given by the present invention. There is an enterprise that runs businesses such as a maintenance service and a management and monitoring service of a network device from a remote location, using the technology described in Non Patent Literature 2. Also, in a network using the OpenFlow described in Patent Literature 1 and Non Patent Literatures 1 and 2, there is a request that content of the policy file or the like be modified from a remote location where a network user is positioned, thereby immediately applying access control in accordance with the modified content.

Though omitted in Patent Literature 2, the technology in Patent Literature 2 needs various setting operations for enabling communication between the remote monitor and control apparatus and the network monitor and control apparatus as well as connection of the remote monitor and control apparatus to the terminal apparatus. Actually, a person in charge of network maintenance goes to the site of each remote location and manually performs such setting operations.

Also, in the network using the OpenFlow described in Patent Literature 1 and Non Patent Literatures 1 and 2, there is a problem that setting operations for achieving communication between a desired resource and an apparatus on the side of a user must be manually performed according to the modified policy, as in the case of Patent Literature 2.

It is an object of the present invention to provide to a user of a network using the OpenFlow described in Patent Literature 1 and Non Patent Literatures 1 and 2 a network management service system, a method, and a program which can contribute to providing a network maintenance and management function from a remote location.

According to a first aspect, there is provided a network management service system including:
a policy management apparatus that manages a communication policy for each user and receives updating of the communication policy from the user;
a control apparatus that generates a packet handling operation of a packet associated with the communication policy of the user, in response to a request from the user, and sets the generated packet handling operation in a forwarding node(s); and the forwarding node(s) that processes the packet, using the packet handling operation generated by the control apparatus.

According to a second aspect, there is provided a control apparatus connected to a policy management apparatus that manages a communication policy for each user and receives updating of the communication policy from the user and a forwarding node(s) that processes a packet using a set packet handling operation;
the control apparatus generating the packet handling operation of the packet associated with the communication policy of the user, in response to a request from the user, and setting the packet handling operation in the forwarding node(s).

According to a third aspect, there is provided a network management service method including:
receiving updated content of a communication policy from each user and managing the communication policy for each user;
generating a packet handling operation of a packet associated with the communication policy of the user, in response to a request from the user, and setting the packet handling operation in a forwarding node(s); and processing the packet,
using the set packet handling operation. This method is tied to a particular machine, which is a computer that controls the forwarding node according to the packet handling operation.

According to a fourth aspect, there is provided a program for causing a computer constituting the control apparatus to execute processes:
receiving updated content of a communication policy from each user and managing the communication policy for each user; and
generating a packet handling operation of a packet associated with the communication policy of the user, in response to a request from the user, and setting the packet handling operation in a forwarding node(s). This program can be recorded in a computer readable storage medium which is nontransitory. That is, the present invention can also be embodied as a computer program product.

The meritorious effects of the present invention are summarized as follows.

According to the present invention, it contribute to provide a network maintenance and management function of a centralized control type network represented by OpenFlow from a remote location.

BRIEF DESCRIPTION OF DRAWINGS

FIG. 2 shows examples of authentication information held in an authentication apparatus in this exemplary embodiment.

FIG. 3 shows examples of information on communication policies stored by a communication policy storage unit in this embodiment.

FIG. 4 shows examples of resource information stored by the communication policy storage unit in this exemplary embodiment.

FIG. 5 shows a communication policy of a user having the user ID of user 1 generated from the information shown in FIGS. 2, 3, and 4.

PREFERRED MODES

Figure 1:
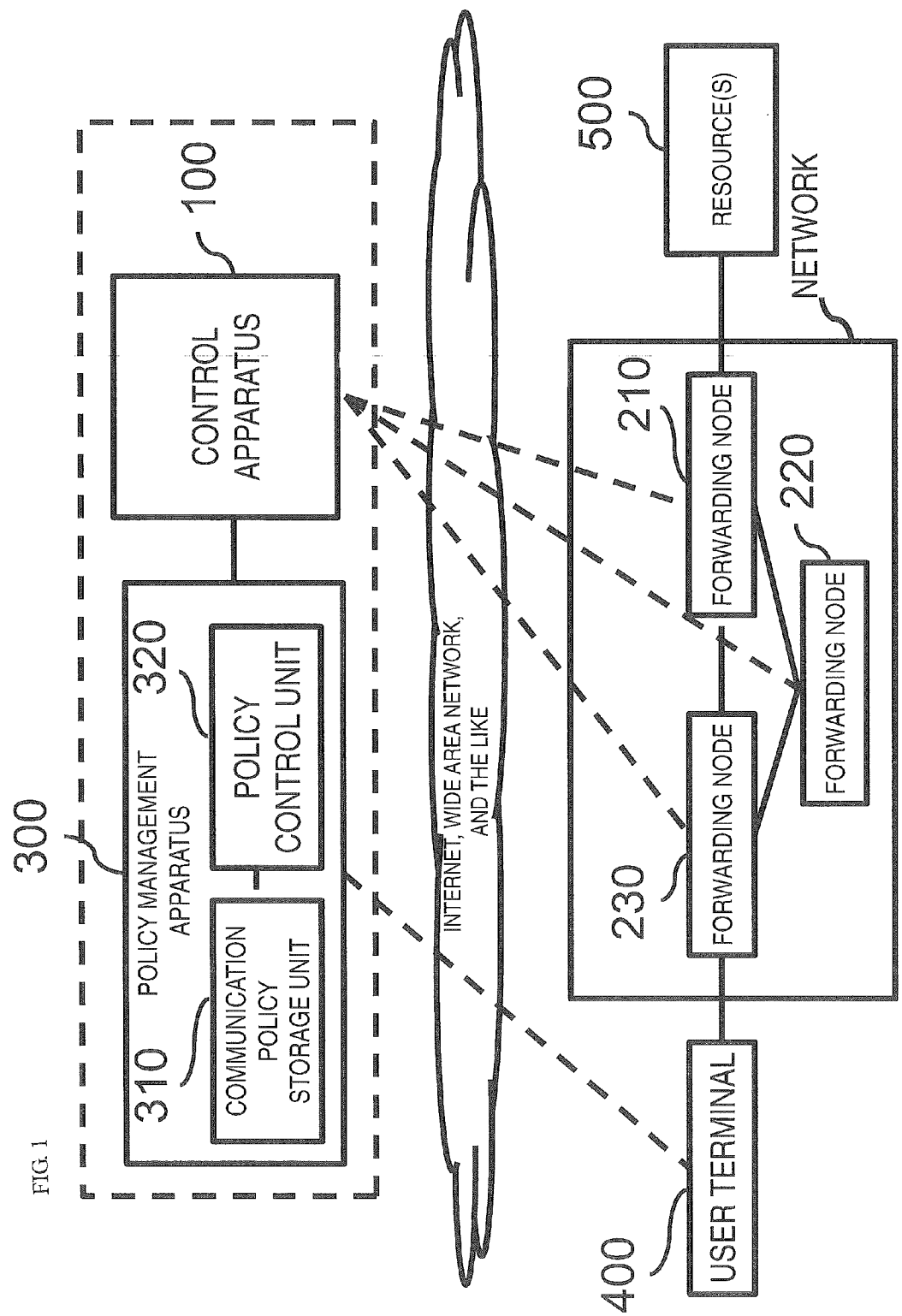
FIG. 1 is a diagram showing a configuration of a network management service system in a first exemplary embodiment of the present disclosure.

First, a outline of one exemplary embodiment of the present disclosure will be described with reference to the drawing. As shown in FIG. 1, the exemplary embodiment of present disclosure can be implemented by forwarding nodes 210, 220, and 230 each of which processes a packet according to a processing rule set by a control apparatus 100, a policy management apparatus 300 that manages a policy for determining the processing rule of a user terminal 400 connected to the forwarding nodes, and the control apparatus 100 that generates the processing rule of the user terminal connected to the forwarding nodes based on the policy for each user managed by the policy management apparatus 300, and sets the processing rule in each of the forwarding nodes. A reference symbol in the drawing appended to this summary is appended to each element as an example for helping understanding of the disclosure, and does not intend to limit the present disclosure to the mode illustrated in the drawing.

More specifically, the policy management apparatus 300 includes a communication policy storage unit 310 that stores an access authorization given to each user as the communication policy and a policy control unit 320 that receives generation or a modification in setting of the communication policy of each user stored in the communication policy storage unit 310, and provides a result of the generation or the modification in the setting of the communication policy to the communication policy storage unit 310 and the control apparatus 100. The policy control unit 320 provides to the control apparatus 100 information on the access authorization of the user of which authentication has succeeded, based on a result of user authentication. The control unit 100 generates a path between the user terminal 400 of which the authentication has succeeded and one of resources 500 that can be accessed by the user, based on information on the access authorization received from the policy management apparatus 300, and sets the processing rule in each of the forwarding nodes on the path.

With the above-mentioned arrangement, according to the access authorization given to each user, the resource 500 that is accessible can be determined, access can be performed by setting the path for each flow, and packet forwarding can be executed through the forwarding nodes. Further, according to the configuration shown in FIG. 1, generation or a modification in setting of the policy from each user can be received, generation or modification of the processing rule can be automatically performed based on the result of the generation or the modification in the setting of the policy, and the generated or modified processing rule can be automatically set again in the forwarding node of which a modification in setting is needed. An expiration date may be provided for the processing rule. Then, the processing rule may be deleted when the expiration date has passed after the processing rule has been set in each of the forwarding nodes 210, 220, and 230 or after a packet matching a matching rule has been finally received.

First Exemplary Embodiment

Next, a first exemplary embodiment of the present disclosure will be described in detail. As shown in FIG. 1, a network management service system in the first exemplary embodiment of the present disclosure is configured to include a network of an enterprise or the like constituted from a plurality of forwarding nodes 210 to 230, a control apparatus 100 that sets a processing rule in each of these forwarding nodes, and a policy management apparatus 300 that notifies a communication policy to the control apparatus 100.

Though omitted in FIG. 1, it is assumed that an authentication apparatus that provides an authentication process of a user and authentication information indicating a result of the authentication is included in the network management service system. To take an example, the authentication apparatus is an authentication server or the like that performs a procedure for user authentication with a user terminal 400, using a password, biometrics authentication information, or the like, and is disposed at a location that can be accessed from the user terminal 400. The authentication apparatus transmits authentication information indicating a result of the procedure for user authentication with the user terminal 400 to the policy management apparatus 300.

FIG. 2 shows examples of the authentication information held in the authentication apparatus. When authentication of the user whose user ID is user 1 has succeeded, for example, the authentication apparatus transmits to the policy management apparatus 300 entries of the user 1 including the user 1, attributes such as an IP address of 192. 168. 100. 1 and a MAC address of 00-00-00-44-55-66, and role IDs of role_0001 and role_0002, as the authentication information. Similarly, when authentication of the user whose user ID is user 2 has succeeded, the authentication apparatus transmits to the policy management apparatus 300 entries of the user 2 including the user 2, attributes such as an IP address of 192. 168. 100. 2 and a MAC address of 00-00-00-77-88-99, and the role ID of role_0002, as the authentication information.

The authentication information may be information, based on which the policy management apparatus 300 can determine the communication policy given to the corresponding user, and is not limited to each of the examples in FIG. 2. The user ID of the user whose authentication has been succeeded, the role ID derived from the user ID, an access ID such as the MAC address, positional information on the user terminal 400, or a combination of these information can be used as the authentication information. Information on the user whose authentication has failed may be of course transmitted as the authentication information, and then, the policy management apparatus 300 may transmit to the control apparatus 100 the communication policy that limits access from the user. Further, the user ID, the role ID, or the positional information on the user terminal 400 can be just used, in place of the authentication information.

Figure 18:
FIG. 18 is a diagram showing a configuration of a flow entry described in Non Patent Literature 2.

Each of the forwarding nodes 210 to 230 is a switching apparatus that processes a received packet according to the processing rule. The processing rule associates processing content to be applied to a packet that matches a matching rule (refer to Match Fields in FIG. 18) and the matching rule to be matched against the received packet. An OpenFlow switch in Non Patent Literature 2 that operates, using a flow entry shown in FIG. 18 as the processing rule, can also be used for each of such forwarding nodes 210 to 230. Resources 500 are connected to the forwarding node 210 in FIG. 1, and the user terminal 400 can be communicated with the resources 500 through the forwarding nodes 210 to 230.

The policy management apparatus 300 includes a communication policy storage unit 310 and a policy control unit 320. The policy management apparatus 300 determines the communication policy of the corresponding user at a timing of receiving the authentication information from the authentication apparatus, receiving the user ID from the user terminal 400 or the like, or requesting transmission of the communication policy from the control apparatus 100. Then, the policy management apparatus 300 transmits the determined communication policy to the control apparatus 100.

FIG. 3 shows examples of information on communication policies stored by the communication policy storage unit 310. Each example in FIG. 3 shows communication policy information where a resource group ID given to a resource group and an access authorization are set, for each role identified by the role ID. The user having the role ID of role_0001, for example, is allowed to access both of a resource group having the resource group ID of resource_group_0001 and a resource group having the resource group ID of resource_group_0002. On the other hand, the user having the role ID of role_0002 is denied to access the resource group having the resource ID of resource_group_0001, and is allowed to access the resource group having the resource ID of resource_group_0002.

FIG. 4 shows examples of resource information stored by the communication policy storage unit 310. In each example in FIG. 4, the resource ID of a resource belonging to the resource group ID is associated with the detailed attribute of the resource. The group identified by the resource group ID of resource_group_0001, for example, includes resources having the resource ID of resource_0001, the resource ID of resource_0002, and resource_0003. Then, the IP address and the MAC address of each resource, and a port number of each resource used for a service can be identified.

The policy management apparatus 300 refers to the communication policy information and the resource information as described above, determines the communication policy of the user authenticated by the authentication apparatus, and notifies the communication policy to the control apparatus 100. Using the role ID included in the authentication information received from the authentication apparatus, for example, contents of the resource group ID associated with the corresponding role ID and the access authorization of the role ID can be identified from the policy information in FIG. 3. Then, the communication policy is generated from the resource information in FIG. 4, using information on the resource belonging to the resource group ID.

FIG. 5 shows the communication policy of the user having the user ID of user 1 that has been generated from the information shown in FIGS. 2, 3, and 4 and is to be provided to the control apparatus 100. Values of information on the attributes of the user having the user ID of user 1 in the authentication information in FIG. 2 are set in transmission source fields in FIG. 5. Resource attributes extracted from the resource information in FIG. 4 are set in destination fields, based on contents of the role ID of the role_0001 in the policy information in FIG. 3. Values that are the same as access authorizations of the role ID of the role_0001 in the policy information in FIG. 3 are set in access authorization fields. The service and the port number set in the field of the resource attribute in the resource information in FIG. 4 are set in a condition (option) field.

Figure 6:
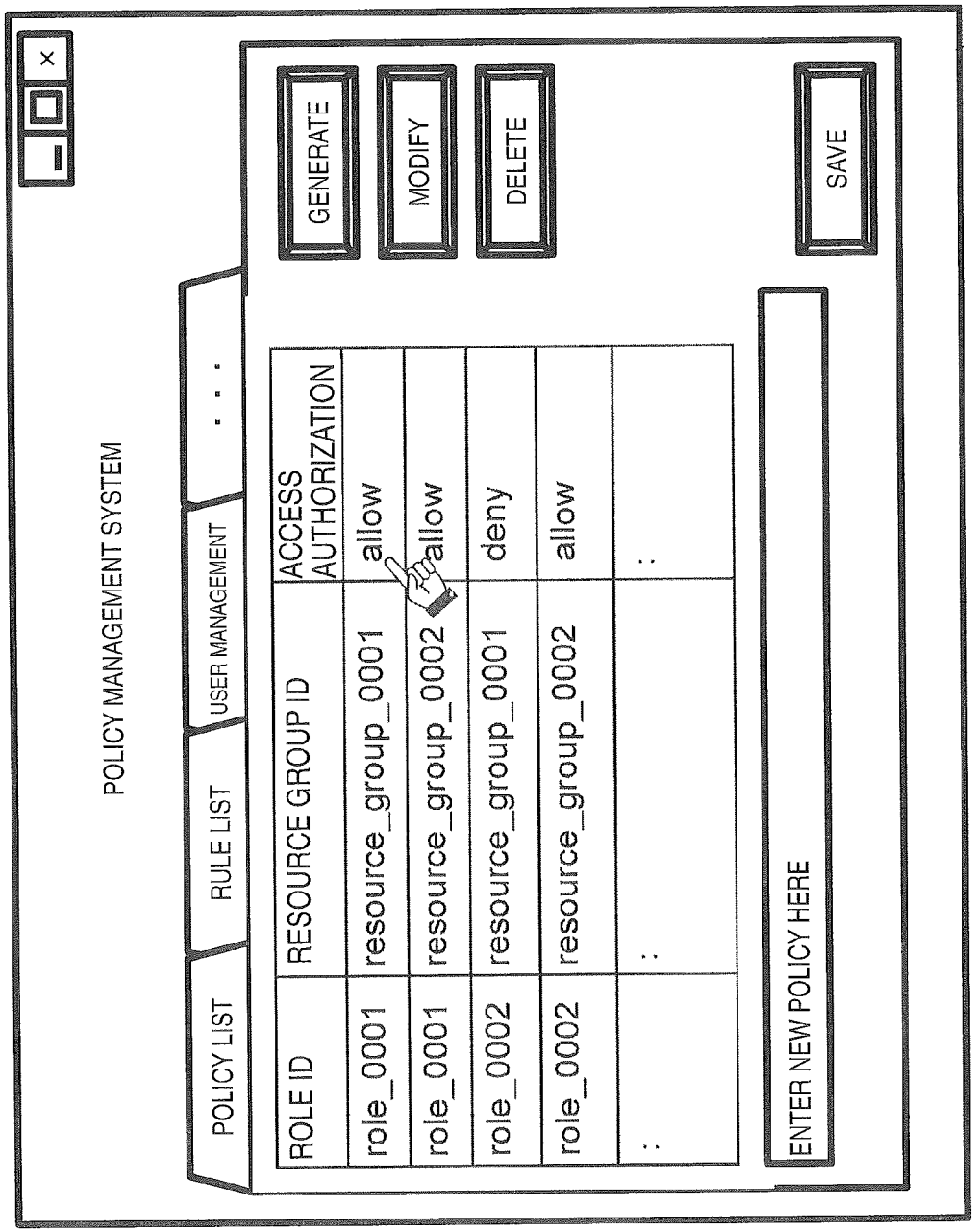
FIG. 6 shows an example of a screen of an application for generating a policy by a user, using a policy control unit in this exemplary embodiment.

The policy control unit 320 of the policy management apparatus 300 also includes means (communication policy editing function) for receiving generation or a modification in setting of the communication policy from the user, and then providing a result of the generation or the modification in the setting of the communication policy to the control apparatus 100. FIG. 6 shows an example of a screen of a Web-based application program (policy management system) that implements the editing function of the communication policy. In the example in FIG. 6, a policy list tab is displayed, so that the communication policy information as shown in FIG. 3 is displayed. By applying a mouse cursor to a policy desired to be generated or deleted, the user can select an item to be edited and then can freely modify content of the item. Using a text entry field (shown in FIG. 6 indicating that "please enter a new policy here"), the user can also generate the new policy. By clicking a "save" button when finishing all policy management operations by the user, a series of information on updating of the policy is saved in the policy control unit 320. The policy control unit 320 records the updated communication policy information in the communication policy storage unit 310, also generates the communication policy of the user based on the updated communication policy information and the resource information, and then transmits the generated communication policy of the user to the control apparatus 100.

In the example in FIG. 6, there are a rule list tab and a user management tab, in addition to the policy list tab. The rule list tab is a function capable of displaying a list of processing rules (rules) each generated based on each policy to allow an arbitrary management operation such as generation, modification, or deletion of each processing rule. The user management tab is a function capable of displaying a list of information on users having access rights to the policy management system (communication policy editing function of the policy control unit 320) in FIG. 6 to allow an arbitrary management operation such as generation, modification, or deletion of each user information. The policy management system in FIG. 6 may include an arbitrary management function in addition to these functions. Alternatively, this policy management system may be a system linked to a different policy management system of a commercially available product to allow use of a function of the different policy management system by this policy management system.

As described above, the policy control unit 320 in this exemplary embodiment allows the user to freely perform a management operation such as policy generation, policy modification, or policy deletion. Such means for policy management (policy management system) may be provided to the user in the form of the Web-based system as described above, or in the form of an independent application running on a PC. Alternatively, such a policy management system may be provided as a CLI (Command Line Interface) rather than an application using a GUI (Graphical User Interface). Such a policy management system may be provided in any form.

When receiving the above-mentioned communication policy from the policy control unit 320, the control apparatus 100 first generates a processing rule for transmitting a request for setting the processing rule for the packet from the user to which the communication policy is to be applied, and sets the processing rule in a selected one of the forwarding nodes 210 to 230. When the control apparatus 100 receives the request for setting the processing rule based on the processing rule, the control apparatus 100 generates a forwarding path of the packet and a processing rule for implementing the forwarding path based on information on the packet included in the request for setting the processing rule, and sets the processing rule for implementing the forwarding path in each forwarding node on the forwarding path of the packet.

Figure 7:
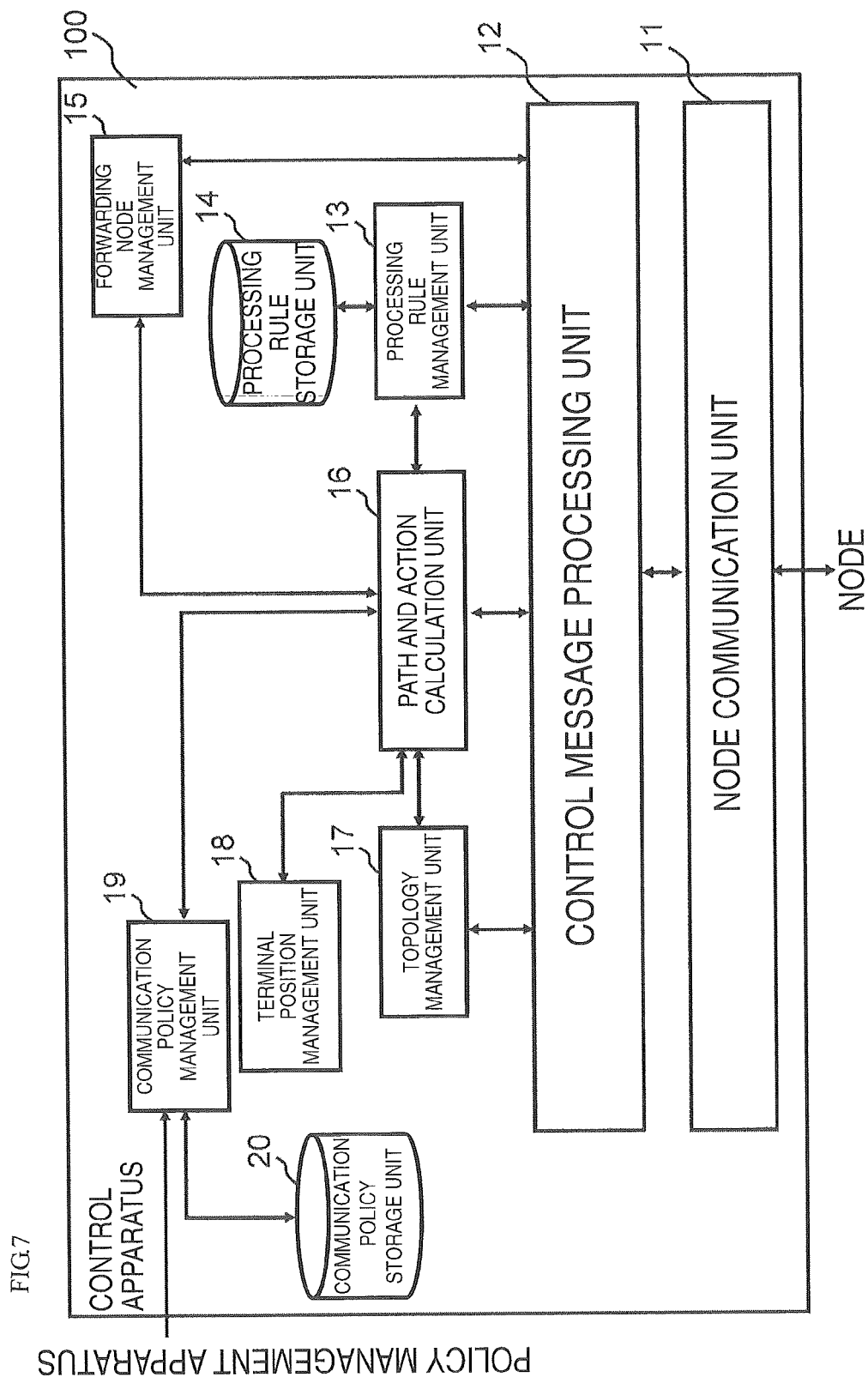
FIG. 7 is a block diagram showing a detailed configuration of a control apparatus 100 in this exemplary embodiment.

FIG. 7 is a block diagram showing a detailed configuration of the control apparatus 100 in this exemplary embodiment. Referring to FIG. 7, the control apparatus 100 is configured to include a node communication unit 11 that performs communication with each of the forwarding nodes 210 to 230, a control message processing unit 12, a processing rule management unit 13, a processing rule storage unit 14, a forwarding node management unit 15, a path and action calculation unit 16, a topology management nit 17, a terminal position management unit 18, a communication policy management unit 19, and a communication policy storage unit 20. These units respectively operate as follows.

The control message processing unit 12 analyzes a control message received from one of the forwarding nodes and delivers control message information to corresponding processing means in the control apparatus 100.

The processing rule management unit 13 manages what processing rule is set in which forwarding node. Specifically, the processing rule generated by the path and action calculation unit 16 is registered in the processing rule storage unit 14 and set is each forwarding node. Together with this operation, even when a modification occurs in the processing rule set in the forwarding node due to a notification of deletion of the processing rule from the forwarding node or the like, the processing rule management unit 13 responds to update the information registered in the processing rule storage unit 14.

The forwarding node management unit 15 manages capability of each forwarding node (such as the number and types of ports and the type of action to be supported) controlled by the control apparatus 100.

When receiving the communication policy from the communication policy management unit 19, the path and action calculation unit 16 refers to a network topology held in the topology management unit 17, and generates the processing rule for executing the request for setting the processing rule of the packet from the user, according to the communication policy. The forwarding node where the processing rule is to be set may be each forwarding node to which the user terminal 400 can connect. Alternatively, the forwarding node (such as the forwarding node 210 in FIG. 1) may be selected by the terminal position management unit 18, based on transmission source information included in the communication policy.

When receiving the request for setting the processing rule based on the processing rule, the path and action calculation unit 16 generates the forwarding path of the packet and the processing rule for implementing the forwarding path, based on information on the packet included in the request for setting the processing rule.

Specifically, the path and action calculation unit 16 calculates the forwarding path of the packet, based on information on the position of a communication terminal managed by the terminal position management unit 18 and network topology information created by the topology management unit 17. Next, the path and action calculation unit 16 obtains information on a port of the forwarding node on the forwarding path from the forwarding node management unit 15, and determines an action to be executed by each forwarding node on the path for implementing the calculated forwarding path and a matching rule for identifying a flow to which the action is to be applied. The matching rule can be generated using the transmission source IP address, the destination IP address, the condition (option), and the like of the communication policy in FIG. 5. Accordingly, in the case of the first entry of the communication policy in FIG. 5, each processing rule defining the action of forwarding the packet addressed from the transmission source IP address of 192. 168. 100. 1 to the destination IP address of 192. 168. 0.1 from a port connected to the forwarding node and one of the resources 500 to be subsequently hopped thereto is generated. When the processing rule is set, the processing rule may be generated not only for the packet from which the request for setting the processing rule has been received, but also for the resource whose access right is possessed by the user terminal and to which the packet is to be forwarded.

The topology management unit 17 creates the network topology information, based on connecting relationships among the forwarding nodes 210 to 230 collected through the node communication unit 11.

The terminal position management unit 18 manages information for identifying the position of a user terminal connected to a communication system. The description will be given assuming that, in this exemplary embodiment, the IP address is used as information for identifying the user terminal, and information on the forwarding node identifier and the port of the forwarding node connected to the user terminal is used as information for identifying the position of the user terminal. Instead of these information, the terminal and the position of the terminal may be of course identified, using information provided from the authentication apparatus or the like.

When receiving information on the communication policy from the policy management apparatus 300, the communication policy management unit 19 stores the information on the communication policy in the communication policy storage unit 20 and also transmits the information on the communication policy to the path and action calculation unit 16.

The control apparatus 100 as described above can also be implemented by adding to the OpenFlow controller described in each of Non Patent Literatures 1 and 2 a function of generating a processing rule (flow entry) triggered by reception of the above-mentioned communication policy.

Each unit (processing means) of the control apparatus 100 shown in FIG. 7 can also be implemented by a computer program for causing a computer constituting the control apparatus 100 to store each of the above-mentioned information and execute each of the above-mentioned processing, using the hardware of the computer.

Figure 8:
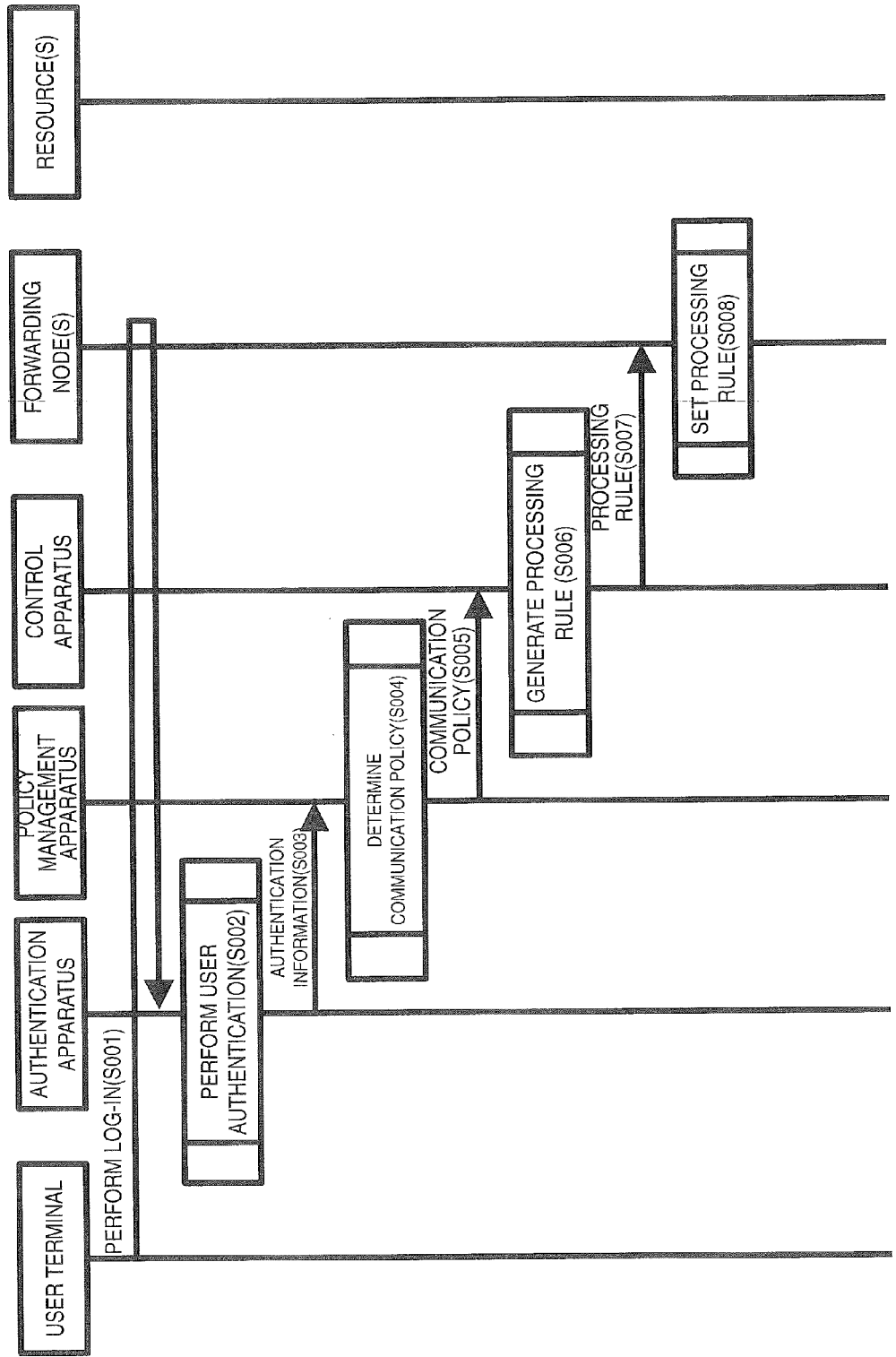
FIG. 8 is a sequence diagram showing a series of operations in this exemplary embodiment.
Figure 9:
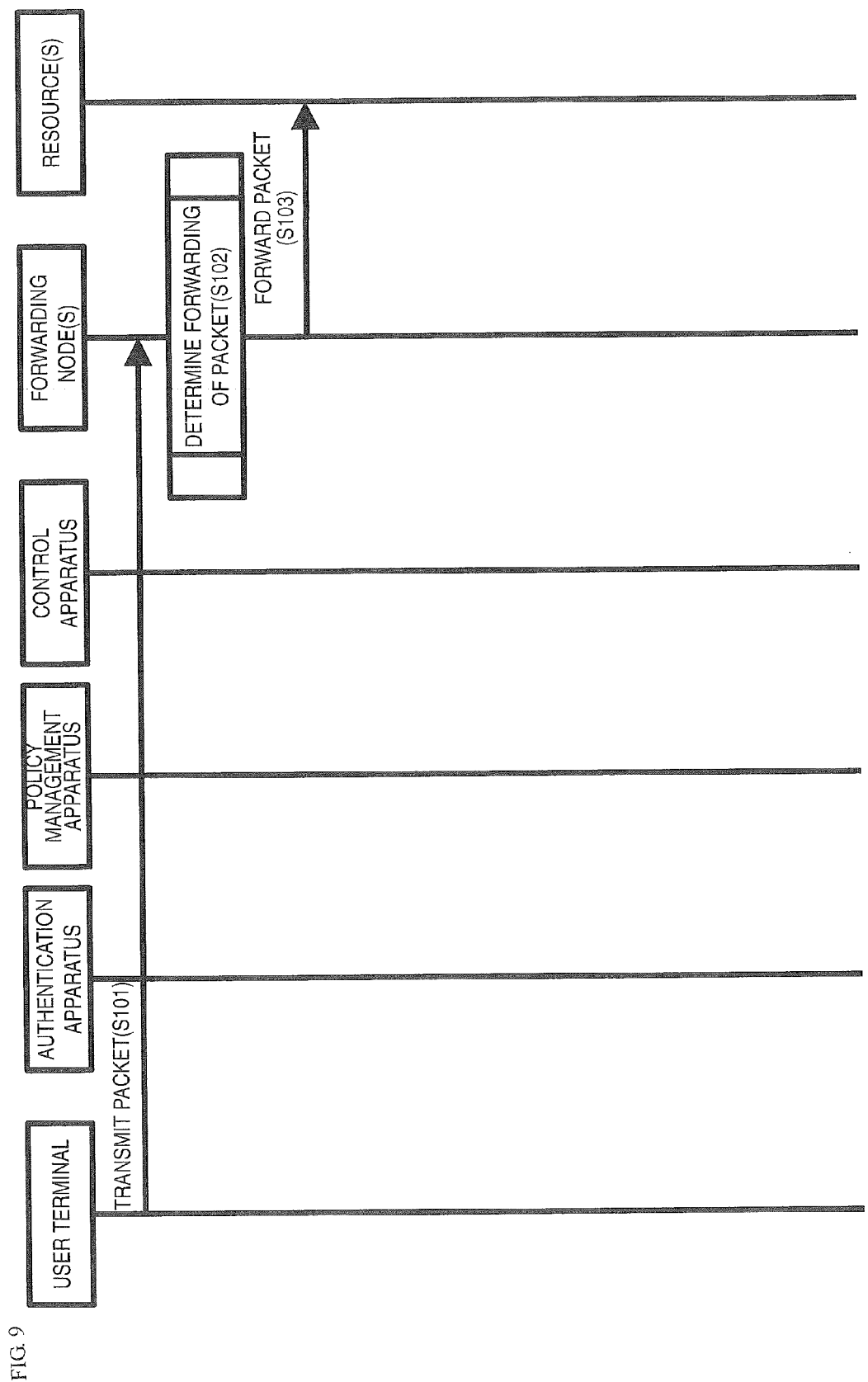
FIG. 9 is a sequence diagram showing a series operations of a packet forwarding process in this exemplary embodiment.

Next, operations of this exemplary embodiment will be described in detail with reference to the drawings. FIGS. 8 and 9 are sequence diagrams showing the series of operations of this exemplary embodiment. Referring to FIG. 8, when the user terminal 400 first makes a log-in request to the authentication apparatus, a packet is forwarded to the authentication apparatus (in step S001 in FIG. 8).

When the authentication apparatus performs user authentication (in step S002 in FIG. 8) and then transmits authentication information to the policy management apparatus 300 (in step S003 in FIG. 8), the policy management apparatus 300 refers to the communication policy storage unit 310 based on the received authentication information to determine the communication policy (in step S004 in FIG. 8). Then, the policy management apparatus 300 transmits the determined communication policy to the control apparatus 100 (in step S005 in FIG. 8).

When receiving the communication policy, the control apparatus 100 generates a processing rule for executing a request for setting the processing rule of the packet from the user terminal (in step S006 in FIG. 8), and transmits the processing rule to each of the forwarding nodes 210 to 230 (in step S007 in FIG. 8). Each of the forwarding nodes 210 to 230 sets the processing rule transmitted from the control apparatus 100 (in step S008 in FIG. 8), thereby completing a series of processes.

Subsequent operations of processes when transmitting the packet from the user terminal, on the basis of the above-mentioned operations, will be described, using FIG. 9.

FIG. 9 is a sequence diagram showing the series of the operations of the forwarding process of the packet. Referring to FIG. 9, the user terminal 400 first transmits the packet addressed to one of the resources 500 (in step S101 in FIG. 9). The packet transmitted from the user terminal 400 arrives at each of the forwarding nodes 210 to 230. Each of the forwarding nodes receives the packet transmitted from the user terminal 400, determines forwarding of the packet according to the processing rule set by the control apparatus 100 (in step S102 in FIG. 9), and then forwards the packet (in step S103 in FIG. 9). With the arrangement as described above, communication between the user terminal 400 and the one of the resources 500 becomes possible.

Figure 10:
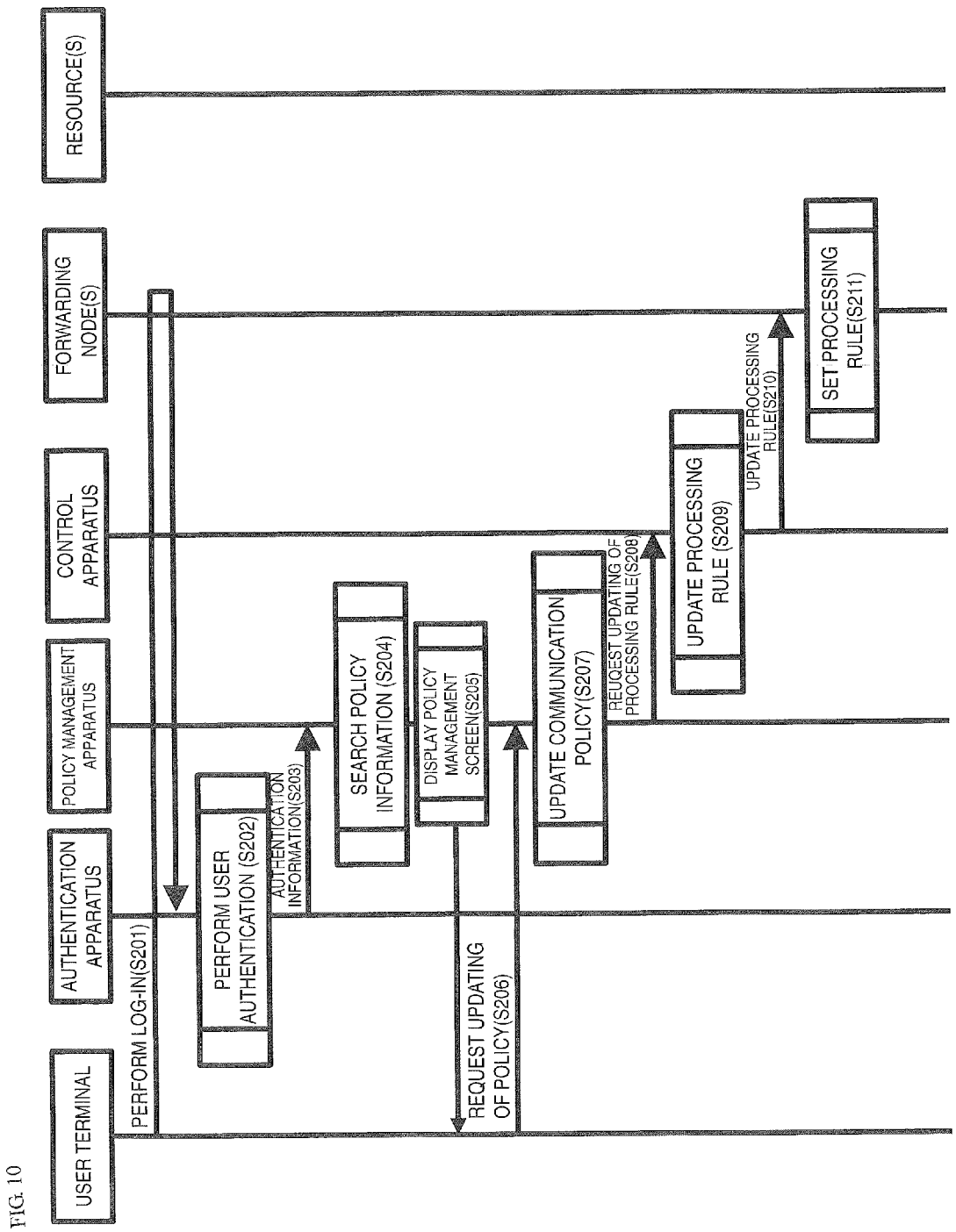
FIG. 10 is a sequence diagram showing a series of operations of a policy management system in this exemplary embodiment.

Next, a description will be directed to a series of operations when the communication policy is generated or modified using the communication policy editing function described with reference to FIG. 6 by the user. FIG. 10 is a sequence diagram showing a series of the operations when communication policy information is updated. Referring to FIG. 10, the user (the user who uses the user terminal 400) first accesses the policy control unit 320 of the policy management apparatus 300 to request use of the communication policy editing function. In this description, the description is given, assuming that the authentication apparatus performs authentication of the user when the user uses the communication policy editing function (in step S201 in FIG. 10).

The authentication apparatus performs the authentication of the user (in step S202 in FIG. 10), and transmits information on the authentication of the user to the policy control unit 320 of the policy management apparatus 300 (in step S203 in FIG. 10).

When receiving the information on the authentication of the user, the policy control unit 320 searches all policies related to the user from the communication policy storage unit 310 of the policy management apparatus 300 (in step S204 in FIG. 10), and displays a result of the search to the user (in step S205 in FIG. 10; refer to FIG. 6). The user arbitrarily modifies the policy, deletes the policy, generates a new policy, or the like, using the policy editing function shown in FIG. 6, for example, and then makes a policy updating request to the policy control unit 320 (in step S206 in FIG. 10). Specifically, the policy updating request is implemented by an operation of clicking a button for policy modification on the screen in FIG. 6 by the user, for example.

The policy control unit 320 that has received the policy updating request updates the communication policy information (in step S207 in FIG. 10), and records a result of the updating in the communication policy storage unit 310. Further, the policy control unit 320 transmits to the control apparatus 100 an updating request of the processing rule related to the updated policy (in step S208 in FIG. 10). In the example in FIG. 10, recording in the communication policy storage unit 310 is performed earlier than transmission of the updating request to the control apparatus 100. However, transmission of the updating request to the control apparatus 100 may be preformed earlier than recording in the communication policy storage unit 310. That is, a timing of recording the updated communication policy information in the communication policy storage unit 310 may be before transmission of the updating request to the control apparatus 100 by the policy management apparatus 300. Alternatively, the timing of recording the updated communication policy information in the communication policy storage unit 310 may be after the transmission of the updating request to the control apparatus 100 by the policy management apparatus 300. Still alternatively, the timing of recording the updated communication policy information in the communication policy storage unit 310 may be simultaneous with the transmission of the updating request to the control apparatus 100 by the policy management apparatus 300.

When the control apparatus 100 receives the updating request of the processing rule from the policy management apparatus 300, the control apparatus 100 regenerates a processing rule using the updated communication policy (in step S209 in FIG. 10), and transmits the processing rule to each of the forwarding nodes 210 to 230 (in step S210 in FIG. 10).

Each of the forwarding nodes 210 to 230 sets the processing rule transmitted from the control apparatus 100 (in step S211 in FIG. 10), thereby completing a series of processes.

Use of the policy editing function provided by the policy control unit 320 of the policy management apparatus 300 by the user as described above makes it possible to execute a Web-based management operation such as policy generation, policy modification, or policy deletion. Content of the policy generation, the policy modification, or the policy deletion is automatically reflected on the processing rule set in each forwarding node through the control apparatus 100. To take an example, when access authorization of a certain role is changed from being possible (allowed) to being impossible (denied) to access by using the policy editing function, a processing rule for executing discarding of a packet from the user is automatically set in each of the forwarding nodes 210 to 230 so as to implement content of being impossible (denied) to access.

As described above, according to this exemplary embodiment, the need for a network expert to go to a particular location to manually set the relevant network apparatus can be eliminated. A network management operation can be thereby reduced.

Second Exemplary Embodiment

Figure 11:
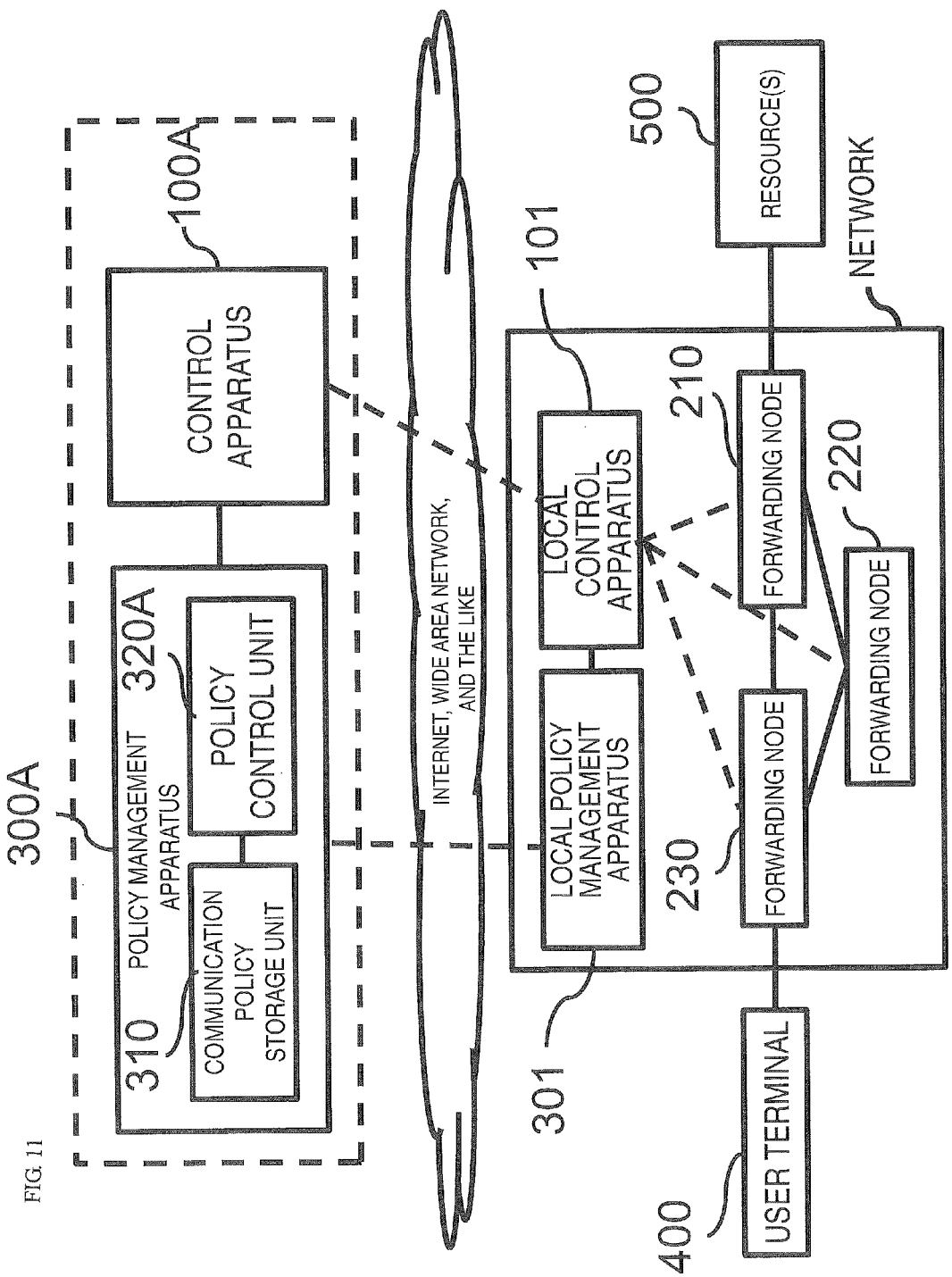
FIG. 11 is a diagram showing a configuration of a network management service system in a second exemplary embodiment.

Next, a second exemplary embodiment of the present disclosure will be described. FIG. 11 is a diagram showing a configuration of a network management service system in the second exemplary embodiment of the present disclosure. A description will be given below, centering on a difference from the configuration and operations of the first exemplary embodiment described above.

Referring to FIG. 11, the configuration of the network management service system in the second exemplary embodiment of the present disclosure is shown. The configuration including a plurality of forwarding nodes 210 to 230, a control apparatus 100A that sets a processing rule in each of these forwarding nodes, and a policy management apparatus 300A that notifies a communication policy to the control apparatus 100A is similar to that in the first exemplary embodiment of the present disclosure. As compared with the configuration of the first exemplary embodiment, a local control apparatus 101 and a local policy management apparatus 301 are added on a network of an enterprise or the like formed of the forwarding nodes 210 to 230, in the second exemplary embodiment. The local control apparatus 101 sets the processing rule to be set in each of these forwarding nodes. The local policy management apparatus 301 notifies the communication policy to the local control apparatus 101.

The local control apparatus 101 synchronizes with the control apparatus 100A of the network management service system, and manages the processing rule to be set in each of the forwarding nodes 210 to 230. The local policy management apparatus 301 synchronizes with the policy management apparatus 300A of the network management service system, and manages the communication policy of each user.

The description will be given, assuming that, in this exemplary embodiment, the local control apparatus 101 and the local policy management apparatus 301 operate, while synchronizing with the control apparatus 100A and the policy management apparatus 300A. The local control apparatus 101 and the local policy management apparatus 301, however, can also operate independently of the control apparatus 100A and the policy management apparatus 300A, on the network of the enterprise or the like. The user may freely choose in which form the local control apparatus 101 and the local policy management apparatus 301 operate.

Figure 12:
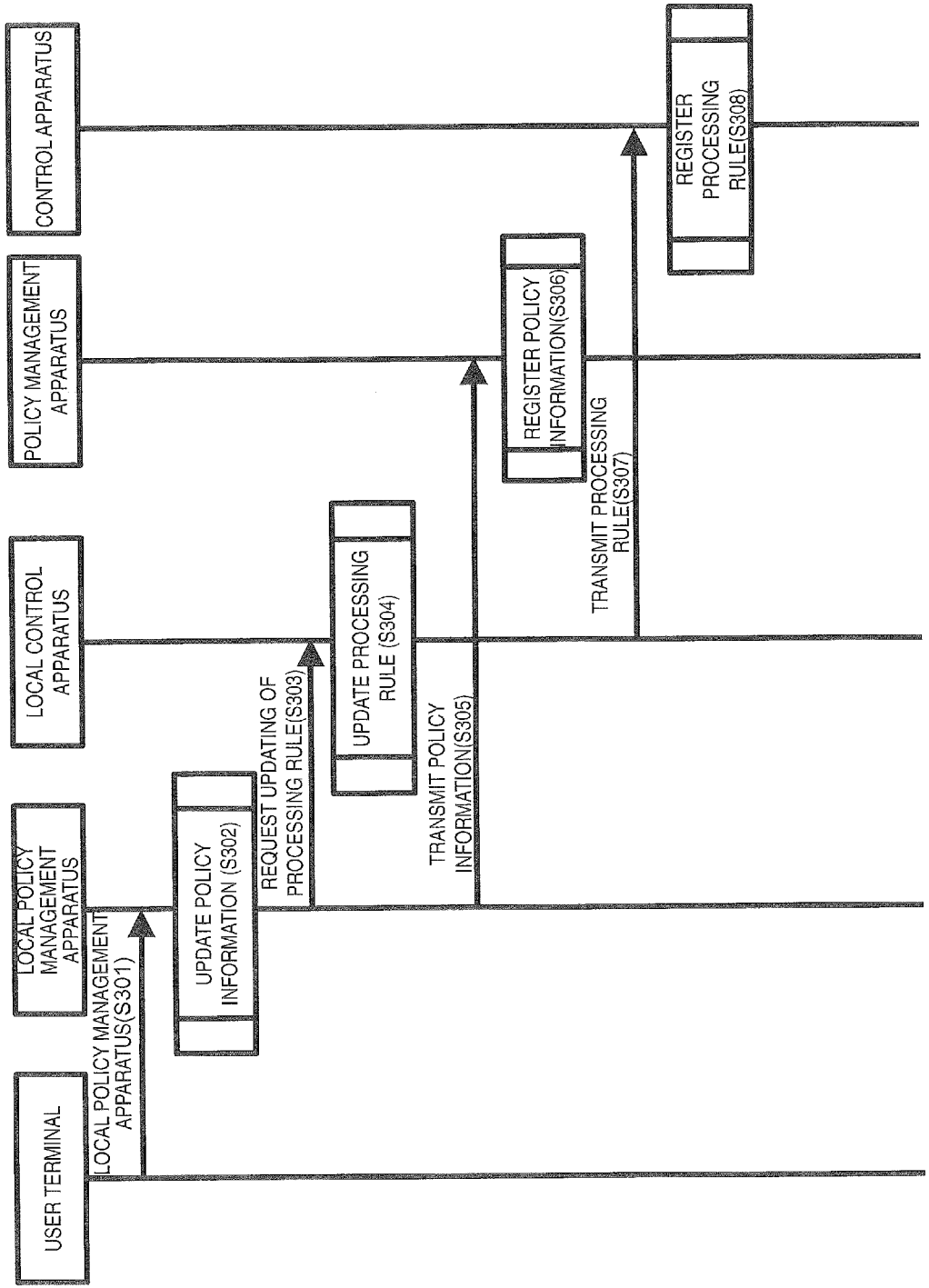
FIG. 12 is a sequence diagram showing a series of operations of a process in which a local control apparatus and a local policy management apparatus in the second exemplary embodiment synchronize with a control apparatus and a policy management apparatus in the network management service system.

Details of operations of the second exemplary embodiment will be described. FIG. 12 is a sequence diagram showing a series of operations of a process where the local control apparatus 101 and the local policy management apparatus 301 synchronize with the control apparatus 100A and the policy management apparatus 300A. Since a procedure for a user authentication process is similar to that in the first exemplary embodiment, description of the procedure for the user authentication process will be omitted.

First, the user makes a policy updating request through the policy editing function of the local policy management apparatus 301 (in step S301 in FIG. 12). The local policy management apparatus 301 receives the policy updating request from the user to update communication policy information (step S302 in FIG. 12).

Further, the local policy management apparatus 301 transmits to the local control apparatus 101 a request for updating a processing rule related to the updated policy (in step S303 in FIG. 12).

When the local control apparatus 101 receives the request for updating the processing rule from the local policy management apparatus 301, the local control apparatus 101 generates a processing rule using the updated communication policy (in step S304 in FIG. 12).

After transmitting the request for modifying the processing rule to the local control apparatus 101, the local policy management apparatus 301 transmits information on the modified communication policy to the policy management apparatus 300A (in step S305 in FIG. 12).

The policy control unit 320A of the policy management apparatus 300A registers in the communication policy storage unit 310 the information on the communication policy received from the local policy management apparatus 301 (in step S306 in FIG. 12).

After completing updating of the processing rule, the local control apparatus 101 transmits to the control apparatus 100A the modified processing rule (in step S307 in FIG. 12).

The control apparatus 100A sets the processing rule received from the local control apparatus 101 in each of the forwarding nodes 210 to 230. The processing rule may be set in each of the forwarding nodes 210 to 230 after updating of the processing rule by the local control apparatus 101 (in step S304 in FIG. 12). Alternatively, the processing rule may be set in each of the forwarding nodes 210 to 230 by the control apparatus 100A, as mentioned above.

A synchronization method may be used in which the policy modification from the user may be received by the policy management apparatus 300A, and a result of processing by the control apparatus 100A may be received by the local policy management apparatus 301 and the local control apparatus 101.

With the arrangement as described above, even when it becomes impossible to use the control apparatus 100A or the policy management apparatus 300A due to a failure or the like, or even when a fault occurs in a network between the control apparatus 100A and each of the forwarding nodes 210 to 230, one set of the control apparatus 100A and the policy management apparatus 300A issues an operation continuing request to the other set of the local control apparatus 101 and the local policy management apparatus 301, thereby allowing continuation of a network management operation by the user. The reason for this is that the local control apparatus 101 and the local policy management apparatus 301 which respectively operate in synchronization with the control apparatus 100A and the policy management apparatus 300A are disposed on the network on the side of the user. Since the need for using the Internet or the wide area network is eliminated for the user, a processing speed for generation of a policy or a processing rule can also be greatly improved. In this exemplary embodiment, improvement in reliability of the whole of the network management service system is achieved by these arrangements.

Third Exemplary Embodiment

Figure 13:
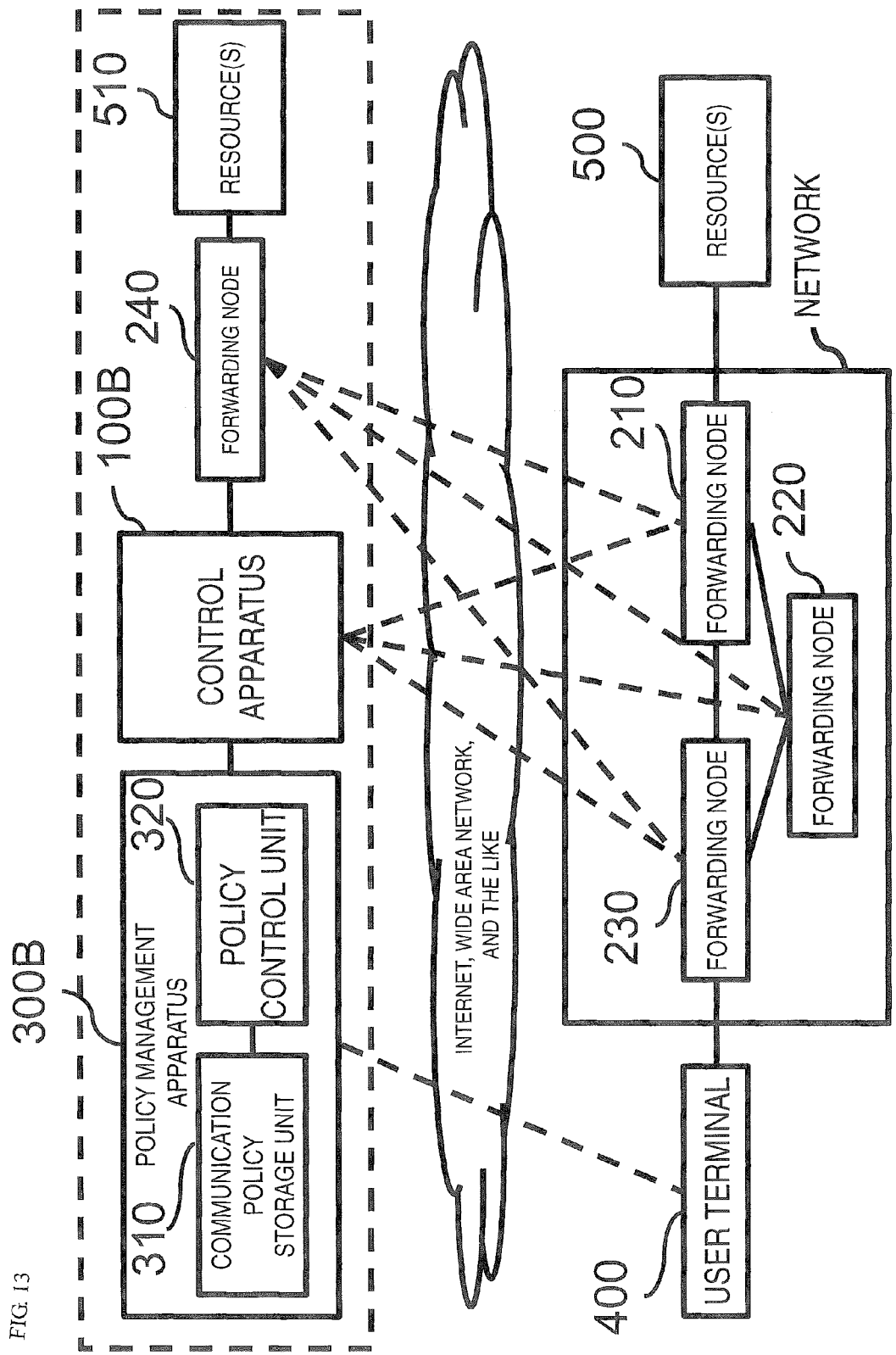
FIG. 13 is a diagram showing a configuration of a network management service system in a third exemplary embodiment.

Next, a third exemplary embodiment of the present disclosure will be described. FIG. 13 is a diagram showing a configuration of a network management service system in the third exemplary embodiment of the present disclosure. The following description will be given below, centering on a difference from the configuration and operations of the first exemplary embodiment described above.

As shown in FIG. 13, the configuration including a plurality of forwarding nodes 210 to 230, a control apparatus 100B that sets a processing rule in each of these forwarding nodes, and a policy management apparatus 300B that notifies a communication policy to the control apparatus 100B is similar to that in the first exemplary embodiment of the present disclosure. As compared with the first exemplary embodiment, a forwarding node (auxiliary forwarding node) 240 and resources (auxiliary resources) 510 are added to the side of the control apparatus 100B, in the third exemplary embodiment.

The forwarding node 240 is similar to each of the forwarding nodes 210 to 230, and the resources 510 are system resources such as a server and a database, being similar to the resources 500.

Operations of the control apparatus 100B and the policy management apparatus 300B are the same as those in the first exemplary embodiment except that the control apparatus 100B and the policy management apparatus 300B can use the forwarding node 240 and the resources 510. Thus, description of the operations of the control apparatus 100B and the policy management apparatus 300B will be omitted.

With the configuration in the third exemplary embodiment as described above, a service provided by each of the forwarding nodes 210 and 230 and each of the resources 500 and a service provided by the forwarding node 240 and each of the resources 510 can be managed by one control apparatus 100B and the policy management apparatus 300B.

Though these forwarding node and resources are respectively disposed in physically different locations from the forwarding nodes 210 to 230 and the resources 500, these forwarding node and resources are so arranged that, when access is made to the forwarding node 240 and one of the resources 510, it seems from a user as if access were made to one of the forwarding nodes 210 to 230 and one of the resources 500. With this arrangement, even when a high load or a fault occurs in one of the forwarding nodes or one of the resources to make it impossible to provide the service to the user, and the service can be seamlessly kept to be provided by changing the access destination of the resource from the user through the forwarding node.

Fourth Exemplary Embodiment

Figure 14:
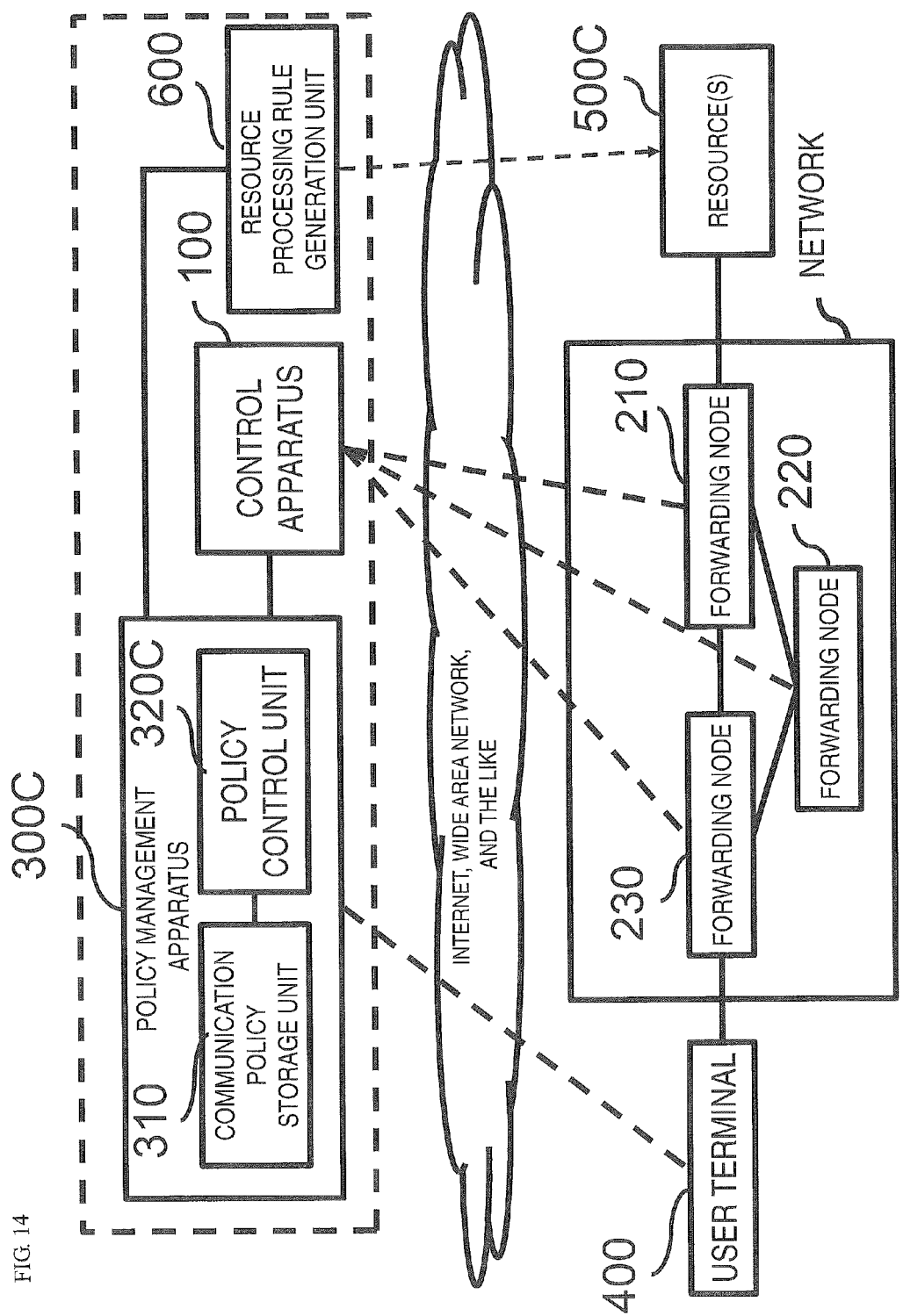
FIG. 14 is a diagram showing a configuration of a network management service system in a fourth exemplary embodiment.

Next, a fourth exemplary embodiment of the present disclosure will be described. FIG. 14 is a diagram showing a configuration of a network management service system in the fourth exemplary embodiment of the present disclosure. The following description will be given below, centering on a difference from the configuration and operations of the first exemplary embodiment described above.

As shown in FIG. 14, the configuration including a plurality of forwarding nodes 210 to 230, a control apparatus 100 that sets a processing rule in each of these forwarding nodes, and a policy management apparatus 300C that notifies a communication policy to the control apparatus 100 is similar to that in the first exemplary embodiment of the present disclosure.

As compared with the first exemplary embodiment, a resource processing rule generation unit 600 that generates a resource access right based on communication policy information for each user held by the policy management apparatus 300C is added, in the fourth exemplary embodiment.

The resource processing rule generation unit 600 receives communication policy information for respective users from the communication policy storage unit 310 of the policy management apparatus 300C, generates resource processing rules using possibility or impossibility of access as access rights to resources, based on the communication policy information, and then sets the resource processing rules in resources 500C.

To take an example, the resource processing rule generation unit 600 generates each resource processing rule, based on the example of the communication policy shown in FIG. 5. The resource processing rule generation unit 600 generates the resource processing rule that allows access to a resource having the IP address of "192. 168. 0. 1" when the IP address of the transmission source is "192. 168. 100. 1" and the condition (option) is "80/tcp", based on the communication policy on the second line of FIG. 5. The communication policy defines that "access authorization is allowed when the IP address of the transmission source is 192. 168. 100. 1, the destination IP address is 192. 168. 0. 1 and the condition (option) is 80/tcp". The resource processing rule generation unit 600 transmits and sets the processing rule in the corresponding one of the resources.

The resource processing rule may be generated, based on the communication policy information held by the policy management apparatus 300C, or based on the processing rule generated by the control apparatus.

When each resource is a server, for example, a packet filtering function such as iptables may be used, and the resource processing rules may be set in the packet filtering function. Alternatively, the resource processing rules may be transmitted to a commercially available access right management system, and the access right management system may set access rights to various resources.

The resource processing rule generation unit 600 can also be implemented as a function of the control apparatus 100 or the policy management apparatus 300C.

Figure 15:
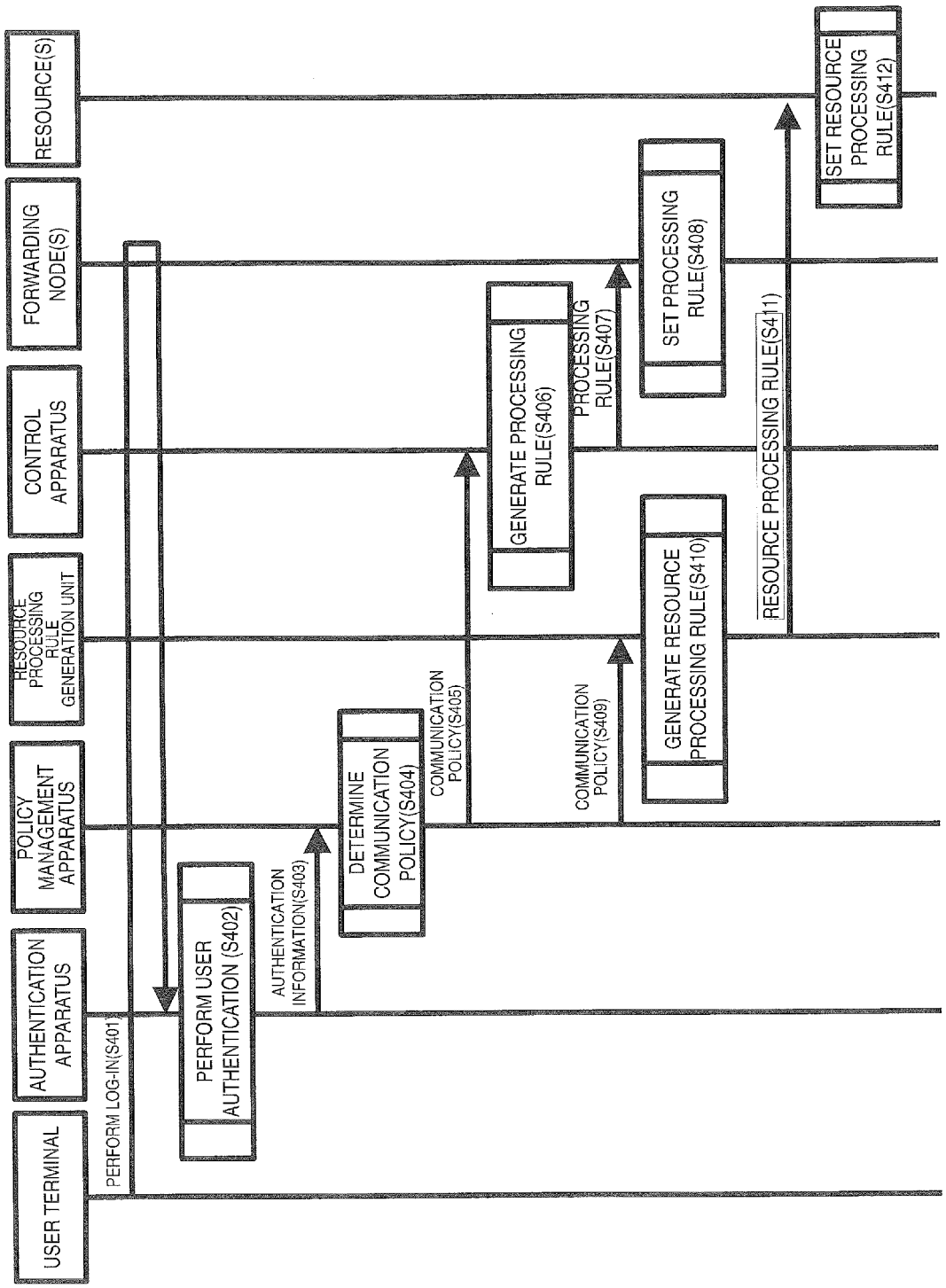
FIG. 15 is a sequence diagram showing a series of operations of the network management service system in the fourth exemplary embodiment.

Details of operations of the fourth exemplary embodiment will be described below. FIG. 15 is a sequence diagram showing a series of operations of the network management service system in the fourth exemplary embodiment. Referring to FIG. 15, the user performs user authentication through an authentication apparatus, and transmits a result of the user authentication to the policy management apparatus 300C. The policy management apparatus 300C determines the communication policy of the user, and transmits a result of the determination to the control apparatus 100. The control apparatus 100 generates a processing rule using the communication policy of the user, and sets a result of the generation in each of the forwarding nodes 210 to 230 (from step S401 to step S408 in FIG. 15). These processes are the same as those in the first exemplary embodiment. Thus, description of these processes will be omitted.

A policy control unit 320 of the policy management apparatus 300C transmits the communication policy of the user whose user authentication has been succeeded to the resource processing rule generation unit 600 (in step S409 in FIG. 15).

The resource processing rule generation unit 600 generates a resource processing rule, based on the communication policy of the user received from the policy management apparatus 300C (in step S410 in FIG. 15), and transmits the resource processing rule to a corresponding one of the resources 500C (in step S411 in FIG. 15).

The corresponding one of the resources 500C sets therein the resource processing rule of the user received from the resource processing rule generation unit 600 (in step S412 in FIG. 15), thereby completing a series of processes. A timing of transmitting the communication policy to the resource processing rule generation unit 600 by the policy management apparatus 300C may be before the transmission of the processing rule to be set in each forwarding node to the control apparatus 100 by the policy management apparatus 300. Alternatively, the timing of transmitting the communication policy to the resource processing rule generation unit 600 may be after the transmission of the processing rule to be set in each forwarding node to the control apparatus 100 by the policy management apparatus 300. Still alternatively, the timing of transmitting the communication policy to the resource processing rule generation unit 600 by the policy management apparatus 300C may be simultaneous with the transmission of the processing rule to be set in each forwarding node to the control apparatus 100 by the policy management apparatus 300C.

As described above, according to this exemplary embodiment, by generating the resource processing rule, which is the access right to the corresponding one of the resources 500C by the resource processing rule generation unit 600 and then by directly setting the resource processing rule in the corresponding one of the resources 500C, a portion of packet processing in each of the forwarding nodes 210 to 230 can be arbitrarily performed by the corresponding one of the resources (server), so that packet processing of the whole of the network including the resources can be distributed.

According to this exemplary embodiment, when there is a processing rule that denies access to one of the resources from a specific user terminal in each of the forwarding nodes 210 to 230, a processing rule that denies the access and is comparable to the processing rule that denies access to the resource is also set in the resource. Provision of double access denial can be thereby made. Security and reliability of the network management service system can be thereby enhanced.

Fifth Exemplary Embodiment

Figure 16:
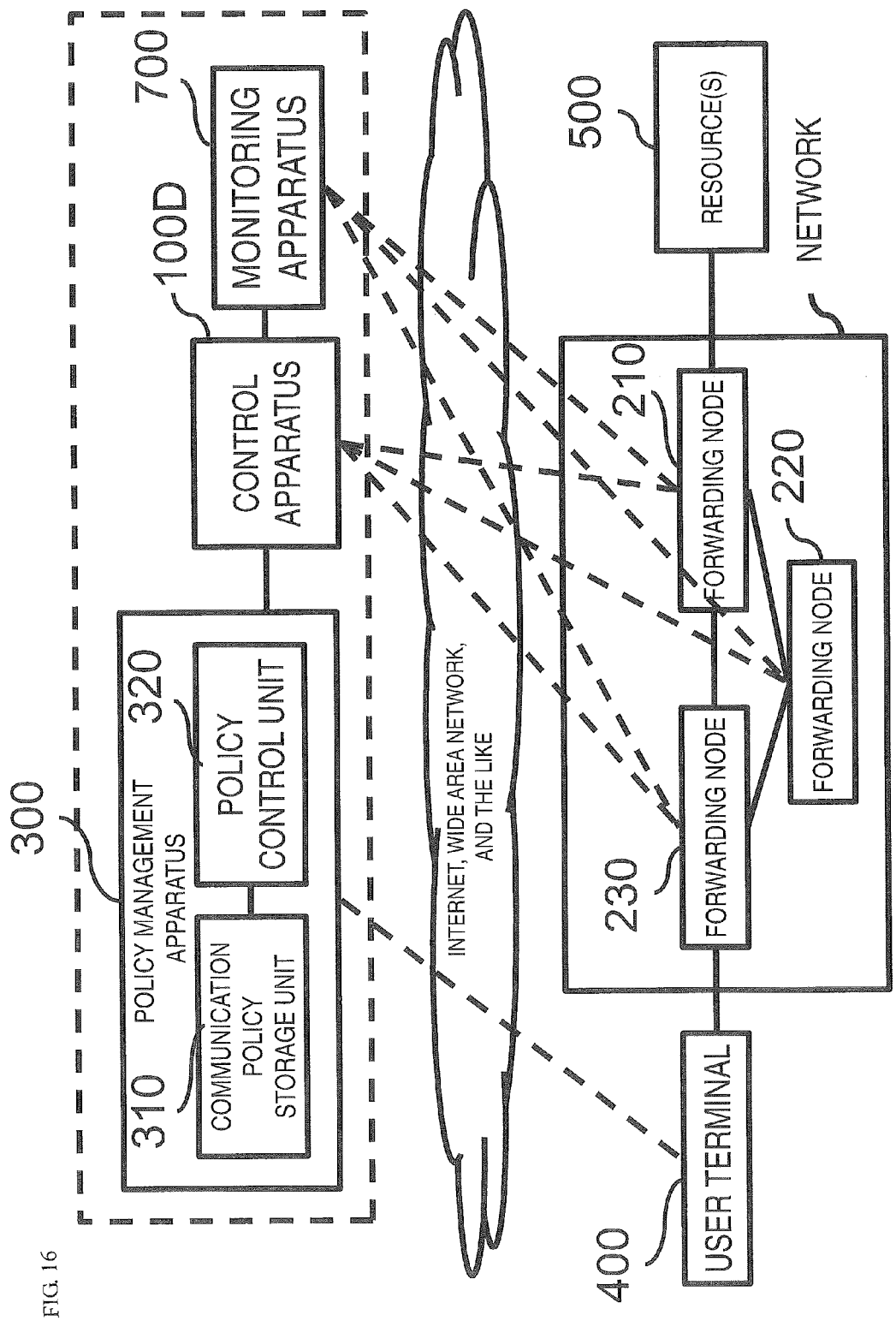
FIG. 16 is a diagram showing a configuration of a network management service system in a fifth exemplary embodiment.

Next, a fifth exemplary embodiment of the present disclosure will be described. FIG. 16 is a diagram showing a configuration of a network management service system in the fifth exemplary embodiment of the present disclosure. The following description will be given, centering on a difference from the configuration and operations of the first exemplary embodiment described above.

As shown in FIG. 16, the configuration including a plurality of forwarding nodes 210 to 230, a control apparatus 100D that sets a processing rule in each of these forwarding nodes, and a policy management apparatus 300 that notifies a communication policy to the control apparatus 100D is similar to that in the first exemplary embodiment of the present disclosure. As compared with the first exemplary embodiment, a monitoring apparatus 700 that monitors an operational status of each of the forwarding nodes 210 to 230 and a modification of a network topology is added in the fifth exemplary embodiment.

The monitoring apparatus 700 always monitors the operational status (failure) of each of the forwarding nodes 210 to 230 and a physical modification of the network topology caused by forwarding node addition, forwarding node deletion, and the like. When such a modification as described above has occurred, the monitoring apparatus 700 notifies content of the modification to the control apparatus 100D.

When the control apparatus 100D receives the notification from the monitoring apparatus 700, the control apparatus 100D regenerates a processing rule, according to the communication policy stored in the communication policy storage unit 310, and then sets the regenerated processing rule in each of the forwarding nodes 210 to 230 or a newly added forwarding node.

The monitoring apparatus 700 may operate together with the policy management apparatus 300 and the control apparatus 100D. Alternatively, the monitoring apparatus 700 may operate, independently of the policy management apparatus 300 and the control apparatus 100D. Still alternatively, the monitoring apparatus 700 may be operated as a function of the policy monitoring apparatus 300 or the control apparatus 100D.

Figure 17:
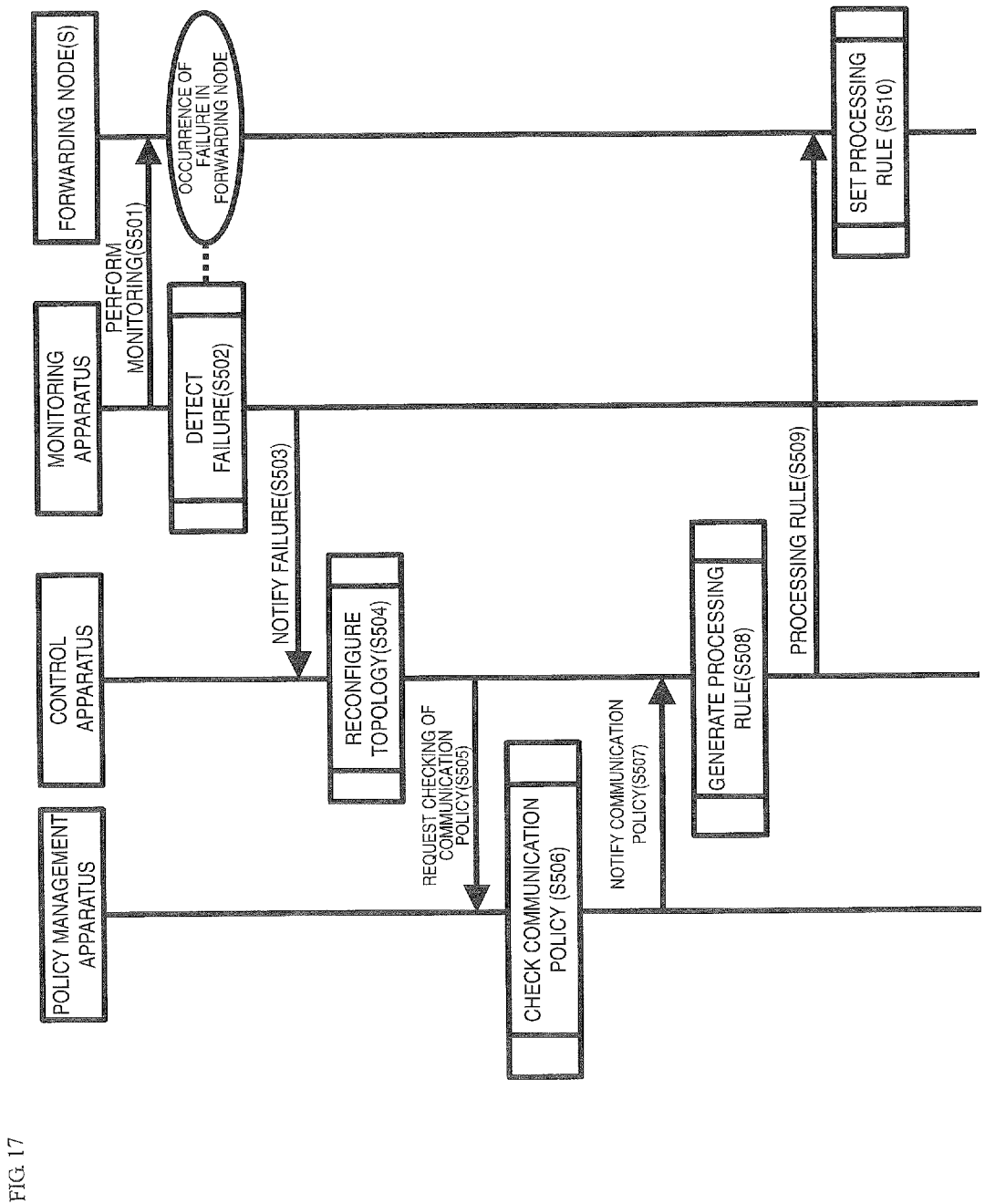
FIG. 17 is a sequence diagram showing a series of operations of the network management service system in the fifth exemplary embodiment.

Details of operations of the fifth exemplary embodiment will be described. FIG. 17 is a sequence diagram showing a series of operations of the network management service system in the fifth exemplary embodiment. Herein, a description will be directed to a flow of a series of processes in which, during monitoring of the forwarding nodes 210 to 230 by the monitoring apparatus 700, the monitoring apparatus 700 detects a failure of the forwarding node 210, and sets a processing rule again in accordance with the detection of the failure.

First, the monitoring apparatus 700 always monitors the forwarding nodes 210 to 230 (in step S501 in FIG. 17). The monitoring may be performed using means for receiving an LLDP (Link Layer Discovery Protocol) from each of the forwarding nodes 210 to 230. Alternatively, the monitoring may be performed together with a forwarding node monitoring function of a commercially available network management system or the like. Any means may be used.

When the monitoring apparatus 700 detects the failure of the forwarding node 220 during monitoring of the forwarding nodes 210 to 230 (in step S502 in FIG. 17), the monitoring apparatus 700 notifies occurrence of the failure of the forwarding node 220 to the control apparatus 100D (in step S503 in FIG. 17).

When receiving the notification of the failure of the forwarding node 220 from the monitoring apparatus 700, the control apparatus 100D updates the configuration of the network topology managed inside the control apparatus 100D (in step S504 in FIG. 17).

Further, the control apparatus 100D transmits a request for checking the communication policy to the policy management apparatus 300 in order to regenerate a processing rule in accordance with the updated network topology (in step S505 in FIG. 17).

When receiving the request for checking the communication policy from the control apparatus 100D, the policy management apparatus 300 checks whether or not there is a modification in the communication policy stored in the communication policy storage unit 310 (in step S506 in FIG. 17), and transmits a result of the checking to the control apparatus 100D (in step S507 in FIG. 17).

When there is the modification in the communication policy in the communication policy storage unit 310, the policy management apparatus 300 transmits to the control apparatus 100D the modified communication policy together with the result of the checking when transmitting the result about the communication policy.

When receiving the notification about the communication policy from the policy management apparatus 300, the control apparatus 100D regenerates the processing rule according to the communication policy (in step S508 in FIG. 17), and transmits the regenerated processing rule to each of the forwarding nodes 210 and 230 (in step S67509 in FIG. 17).

Each of the forwarding nodes 210 and 230 sets the processing rule received from the control apparatus 100D again (in step S510 in FIG. 17), thereby finishing the series of processes.

As described above, the monitoring apparatus 700 always monitors the operational status of each of the forwarding nodes 210 to 230, a modification of the network topology, and forwarding node addition, forwarding node deletion, and the like. Then, when the monitoring apparatus 700 detects an abnormality such as the failure, the monitoring apparatus notifies the abnormality of one of the forwarding nodes to the control apparatus 100D.

Upon receipt of the notification, the control apparatus 100D and the policy management apparatus 300 can dynamically regenerate the processing rule, and then can set the regenerated processing rule in each of the forwarding nodes. With this arrangement, the network management service system dynamically copes with an abnormality of the network formed of the forwarding nodes simultaneously with occurrence of the abnormality of the forwarding node, rather than coping with the abnormality of the network upon receipt of notification such as a claim from a user. Reliability of the network can be thereby enhanced.

When the monitoring apparatus detects the abnormality of the forwarding node, the control apparatus 100D may request the policy management apparatus 300 to check the communication policy immediately after occurrence of the abnormality again. In this case, the policy management apparatus checks content of the communication policy, based on the request. When the content of the communication policy immediately after the occurrence of the abnormality of the forwarding node differs from content of the communication policy immediately before the occurrence of the abnormality, the policy management apparatus transmits to the control apparatus the communication policy including a portion of the communication policy that is different from the content of the communication policy immediately before the occurrence of the abnormality. The control apparatus 100D generates the processing rule, based on the communication policy received from the policy management apparatus 300, and then sets the processing rule in the forwarding nodes.

The above description was directed to each exemplary embodiment of the present disclosure. The present disclosure can be further varied, replaced, or adjusted without departing from the basic technical concept of the present disclosure. In the exemplary embodiments described above, the description was given, assuming that the control apparatus 100, the policy management apparatus 300, the communication policy storage unit 310, the policy control unit 320, the local control apparatus 101, the local policy management apparatus 301, the resource processing rule generation unit 600, and the monitoring apparatus 700 are independently provided. A configuration in which these units are appropriately integrated may be adopted.

In the above-mentioned exemplary embodiments, FIGS. 2 to 5 were presented, and the description was thereby given, assuming that a rule ID is given to each user to perform access control. The access control can also be performed using a user ID provided for each user, an access ID such as a MAC address, positional information on the user terminal 400, or the like.

In the above-mentioned exemplary embodiments, the description was given, assuming that the user terminal 400 performs an authentication procedure using the authentication apparatus, through the forwarding nodes 210 to 230. A configuration can also be adopted where the user terminal 400 directly communicates with the authentication apparatus to perform the authentication procedure.

Finally, preferred modes of the present disclosure will be summarized.

[Mode 1]

(Refer to the network management service system according to the first aspect.)

[Mode 2]

In the network management service system of Mode 1, the control apparatus receives a request for generating the packet handling operation from the user through the Internet, generates the packet handling operation of the packet associated with the communication policy of the user, and sets the generated packet handling operation in the forwarding node(s).

[Mode 3]

In the network management service system of Mode 1 or 2,
the control apparatus generates the communication policy of each user, using information on a role given to each user and an authorization of access to a resource for each role, and generates the packet handling operation of the packet associated with the communication policy.

[Mode 4]

In the network management service system of any one of Modes 1 to 3,
further comprising in a same region as a region where the forwarding node(s) physically exists:
a local control apparatus that mu execute a same process as the control apparatus and
a local policy management apparatus that may execute a same process as the policy management apparatus.

[Mode 5]

In the network management service system of Mode 4, the local control apparatus generates the packet handling operation of the packet associated with the communication policy of the user, in response to the request from the user, sets the generated packet handling operation in the forwarding node(s), and transmits the packet handling operation to the control apparatus to synchronize the packet handling operation between the control apparatus and the local control apparatus.

[Mode 6]

In the network management service system of Mode 4 or 5,
the local policy management apparatus transmits the communication policy for each user to the policy management apparatus to synchronize the communication policy between the policy management apparatus and the local policy management apparatus.

[Mode 7]

In the network management service system of any one of Modes 4 to 6,
when an abnormality occurs in one or both of the local control apparatus and the local policy management apparatus, management of the communication policy for each user and a process of generating the packet handling operation in accordance with the communication policy are requested to the control apparatus and the policy management apparatus.

[Mode 8]

In the network management service system of any one of Modes 4 to 7, when a fault occurs in one or both of the control apparatus and the policy management apparatus, the management of the communication policy for each user and the process of generating the packet handling operation in accordance with the communication policy are requested to the local control apparatus and the local policy management apparatus.

[Mode 9]

In the network management service system of any one of Modes 1 to 8, further comprising in a same region as a region where the control apparatus and the policy management apparatus physically exist:
an auxiliary forwarding node(s) that receives the packet handling operation generated by the control apparatus and then processes the packet; and
an auxiliary resource(s) connected to the forwarding node(s).

[Mode 10]

In the network management service system of Mode 9, when an abnormality occurs in the forwarding node and the resource, the control apparatus sets in the auxiliary forwarding node(s) a packet handling operation for implementing communication to the auxiliary resource(s), and permits communication from a user terminal to the auxiliary resource(s).

[Mode 11]

In the network management service system of any one of Modes 1 to 10, further comprising: a resource packet handling operation generation unit that generates a packet handling operation indicating a right of access to the resource(s), using the communication policy for each user held by the policy management apparatus, and causes the resource(s) to perform access control in accordance with the packet handling operation.

[Mode 12]

In the network management service system of any one of Modes 1 to 11, further comprising: a monitoring apparatus that monitors an operational status of the forwarding node(s) and a network configuration of the forwarding node(s).

[Mode 13]

In the network management service system of Mode 12, when the monitoring apparatus detects the abnormality of the forwarding node(s), the monitoring apparatus requests the policy management apparatus to check the communication policy immediately after occurrence of the abnormality again;
the policy management apparatus checks content of the communication policy based on the request, and when the content of the communication policy immediately after the occurrence of the abnormality of the forwarding node(s) differs from content of the communication policy immediately before the occurrence of the abnormality of the forwarding node(s), the policy management apparatus transmits to the control apparatus the communication policy including a portion of the communication policy that is different from the content of the communication policy immediately before the occurrence of the abnormality of the forwarding node(s); and the control apparatus receives the communication policy from the policy management apparatus, generates a packet handling operation based on the communication policy, and sets the packet handling operation in the forwarding node(s).

[Mode 14]

In the network management service system of Mode 12 or 13, the monitoring apparatus further notifies the occurrence of the abnormality of the forwarding node(s) to the control apparatus when the monitoring apparatus detects the abnormality of the forwarding node(s); and the control apparatus checks information on the network configuration of the forwarding node(s) held by the control apparatus again, based on the notification from the monitoring apparatus, and dynamically updates the held network configuration information.

[Mode 15]

In the network management service system of any one of Modes 1 to 14, the policy management apparatus and the control apparatus are disposed in a first region;

the forwarding node(s) is disposed in a second region different from the first region; and the policy management apparatus and an authentication apparatus that performs user authentication with the user terminal are connected through the Internet, and the control apparatus and the forwarding node(s) are connected through a wide area network.

[Mode 16]

(Refer to the control apparatus according to the second aspect.)

[Mode 17]

(Refer to the network management service method according to the third aspect.)

[Mode 18]

(Refer to the computer program according to the fourth aspect.)

Each disclosure of the Patent and Non Patent literatures listed above is incorporated herein by reference. Modifications and adjustments of the exemplary embodiments are possible within the scope of the overall disclosure (including claims) of the present invention, and based on the basic technical concept of the invention. Various combinations and selections of various disclosed elements (including each element of each claim, each element of each example, each element of each drawing, and the like) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

REFERENCE SIGNS LIST 11 node communication unit
12 control message processing unit
13 processing rule management unit
14 processing rule storage unit
15 forwarding node management unit
16 path and action calculation unit
17 topology management unit
18 terminal position management unit
19 communication policy management unit
20 communication policy storage unit
100, 100A, 100B, 100D control apparatus
101 local control apparatus
210, 220, 230, 240 forwarding node
300, 300A, 300B, 300C policy management apparatus
301 local policy management apparatus
310 communication policy storage unit
320, 320A, 320C policy control unit
400 user terminal
500, 500C, 510 resource(s)
600 resource processing rule generation unit
700 monitoring apparatus

What is claimed is:

1. A network management service system, including:
a policy management apparatus that receives updating of a communication policy from a user and manages the communication policy for each user;
a control apparatus that generates a packet handling operation of a packet associated with the communication policy of the user, in response to a request from the user, and sets the generated packet handling operation in a forwarding node(s);
the forwarding node(s) that processes the packet, using the packet handling operation generated by the control apparatus; and
in a same region as a region where the forwarding node(s) physically exists:
a local control apparatus that is configured a same process as the control apparatus; and
a local policy management apparatus that is configured to execute a same process as the policy management apparatus,
wherein, when a fault occurs in one or both of the control apparatus and the policy management apparatus, management of the communication policy for each user and process of generating the packet handling operation in accordance with the communication policy are requested to the local control apparatus and the local policy management apparatus.

2. The network management service system according to claim 1, wherein the control apparatus receives a request for generating the packet handling operation from the user through Internet, generates the packet handling operation of the packet associated with the communication policy of the user, and sets the generated packet handling operation in the forwarding node(s).

3. The network management service system according to claim 2, wherein the control apparatus generates the communication policy of each user, using information on a role given to each user and an authorization of access to a resource for each role, and generates the packet handling operation of the packet associated with the communication policy.

4. The network management service system according to claim 1, wherein the control apparatus generates the communication policy of each user, using information on a role given to each user and an authorization of access to a resource for each role, and generates the packet handling operation of the packet associated with the communication policy.

5. The network management system according to claim 1, wherein the local control apparatus generates the packet handling operation of the packet associated with the communication policy of the user, in response to the request from the user, sets the generated packet handling operation in the forwarding node(s), and transmits the packet handling operation to the control apparatus to synchronize the packet handling operation between the control apparatus and the local control apparatus.

6. The network management service system according to claim 1, wherein the local policy management apparatus transmits the communication policy for each user to the policy management apparatus to synchronize the communication policy between the policy management apparatus and the local policy management apparatus.

7. The network management service system according to claim 1, wherein, when an abnormality occurs in one or both of the local control apparatus and the local policy management apparatus, the management of the communication policy for each user and the process of generating the packet handling operation in accordance with the communication policy are requested to the control apparatus and the policy management apparatus.

8. The network management service system according to claim 1, further comprising:
a resource packet handling operation generation unit that generates a packet handling operation indicating a right of access to the resource(s), using the communication policy for each user held by the policy management apparatus, and causes the resource(s) to perform access control in accordance with the packet handling operation.

9. The network management service system according to claim 1, wherein the policy management apparatus and the control apparatus are disposed in a first region,
wherein the forwarding node(s) is disposed in a second region different from the first region, and
wherein the policy management apparatus and an authentication apparatus that performs user authentication with the user terminal are connected through the Internet, and the control apparatus and the forwarding node(s) are connected through a wide area network.

10. A network management service system, including:
a policy management apparatus that receives updating of a communication policy from a user and manages the communication policy for each user;
a control apparatus that generates a packet handling operation of a packet associated with the communication policy of the user, in response to a request from the user, and sets the generated packet handling operation in a forwarding node(s);
the forwarding node(s) that processes the packet, using the packet handling operation generated by the control apparatus; and
a monitoring apparatus that monitors an operational status of the forwarding node(s) and a network configuration of the forwarding node(s),
wherein, when the monitoring apparatus detects an abnormality of the forwarding node(s), the monitoring apparatus requests the policy management apparatus to check the communication policy immediately after occurrence of the abnormality again,
wherein the policy management apparatus checks content of the communication policy based on the request, and when the content of the communication policy immediately after the occurrence of the abnormality of the forwarding node(s) differs from content of the communication policy immediately before the occurrence of the abnormality of the forwarding node(s), the policy management apparatus transmits to the control apparatus the communication policy including a portion of the communication policy that is different from the content of the communication policy immediately before the occurrence of the abnormality of the forwarding node(s), and
wherein the control apparatus receives the communication policy from the policy management apparatus, generates a packet handling operation based on the communication policy, and sets the packet handling operation in the forwarding node(s).

11. The network management service system according to claim 10, further comprising in a same region as a region where the control apparatus and the policy management apparatus physically exist:
an auxiliary forwarding node(s) that receives the packet handling operation generated by the control apparatus and then processes the packet; and
an auxiliary resource(s) connected to the forwarding node(s).

12. The network management service system according to claim 11, wherein, when an abnormality occurs in the forwarding node and the resource, the control apparatus sets in the auxiliary forwarding node(s) a packet handling operation for implementing communication to the auxiliary resource(s), and permits communication from a user terminal to the auxiliary resource(s).

13. The network management service system according to claim 10, wherein the monitoring apparatus further notifies the occurrence of an abnormality of the forwarding node(s) to the control apparatus when the monitoring apparatus detects the abnormality of the forwarding node(s), and
wherein the control apparatus checks information on the network configuration of the forwarding node(s) held by the control apparatus again, based on the notification from the monitoring apparatus, and dynamically updates the held network configuration information.

14. A control apparatus connected to a policy management apparatus that receives updating of a communication policy from a user and manages the communication policy for each user and a forwarding node(s) that processes a packet using a set packet handling operation,
the control apparatus generating the packet handling operation of the packet associated with the communication policy of the user, in response to a request from the user, and setting the packet handling operation in the forwarding node(s),
wherein, in a same region as a region where the forwarding node(s) physically exists:
a local control apparatus is configured to execute a same process as the control apparatus; and
a local policy management apparatus is configured to execute a same process as the policy management apparatus, and
wherein, when a fault occurs in one or both of the control apparatus and the policy management apparatus, management of the communication policy for each user and the process of generating the packet handling operation in accordance with the communication policy are requested to the local control apparatus and the local policy management apparatus.

15. A network management service method, including:
receiving, by a policy management apparatus, updated content of a communication policy from a user and managing the communication policy for each user;
generating, by a control apparatus, a packet handling operation of a packet associated with the communication policy of the user, in response to a request from the user, and setting the packet handling operation in a forwarding node(s); and processing the packet, using the set packet handling operation, wherein, in a same region as a region where the forwarding node(s) physically exists:
  a local control apparatus is configured to execute a same process as the control apparatus; and
  a local policy management apparatus is configured to execute a same process as the policy management apparatus, and wherein, when a fault occurs in one or both of the control apparatus and the policy management apparatus, management of the communication policy for each user and the process of generating the packet handling operation in accordance with the communication policy are requested to the local control apparatus and the local policy management apparatus.

* * * * *